(12) United States Patent
Li et al.

(10) Patent No.: US 11,949,853 B2
(45) Date of Patent: Apr. 2, 2024

(54) DATA DECODING METHOD AND APPARATUS, AND DATA CODING METHOD AND APPARATUS

(71) Applicant: TENCENT TECHNOLOGY (SHENZHEN) COMPANY LTD, Guangdong (CN)

(72) Inventors: Yiming Li, Shenzhen (CN); Xiaozhong Xu, Shenzhen (CN); Ye Hu, Shenzhen (CN); Shan Liu, Shenzhen (CN); Zhenzhong Chen, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 315 days.

(21) Appl. No.: 17/470,636

(22) Filed: Sep. 9, 2021

(65) Prior Publication Data
US 2021/0409688 A1     Dec. 30, 2021

Related U.S. Application Data

(63) Continuation of application No. PCT/CN2020/111246, filed on Aug. 26, 2020.

(30) Foreign Application Priority Data

Aug. 26, 2019 (CN) .......................... 201910792449.9

(51) Int. Cl.
*H04N 19/107*  (2014.01)
*H04N 19/159*  (2014.01)
(Continued)

(52) U.S. Cl.
CPC ......... *H04N 19/107* (2014.11); *H04N 19/159* (2014.11); *H04N 19/176* (2014.11); *H04N 19/46* (2014.11); *H04N 19/70* (2014.11)

(58) Field of Classification Search
CPC .. H04N 19/107; H04N 19/159; H04N 19/176; H04N 19/46; H04N 19/70
See application file for complete search history.

(56) References Cited

U.S. PATENT DOCUMENTS

2014/0003515 A1* 1/2014 Ohgose ................ H04N 19/176
                                                                   375/240.12
2016/0227244 A1    8/2016 Rosewarne
(Continued)

FOREIGN PATENT DOCUMENTS

| CN | 101217663 A | 7/2008 |
| CN | 101222641 A | 7/2008 |

(Continued)

OTHER PUBLICATIONS

International Search Report for PCT/CN2020/111246 dated Nov. 9, 2020.
(Continued)

*Primary Examiner* — Fabio S Lima
(74) *Attorney, Agent, or Firm* — Sughrue Mion, PLLC

(57) ABSTRACT

A data decoding method, performed by a computer device, is provided. The data decoding method includes obtaining coded data corresponding to a current to-be-decoded unit, obtaining a coding mode restriction type corresponding to the current to-be-decoded unit by decoding the coded data, determining a candidate coding mode set corresponding to the current to-be-decoded unit according to the coding mode restriction type, the candidate coding mode set comprising a block copy intra-frame coding mode, selecting a target coding mode from the candidate coding mode set, and decoding the current to-be-decoded unit according to the target coding mode, thereby obtaining corresponding decoded data.

20 Claims, 8 Drawing Sheets

(51) Int. Cl.
*H04N 19/176* (2014.01)
*H04N 19/46* (2014.01)
*H04N 19/70* (2014.01)

(56) References Cited

U.S. PATENT DOCUMENTS

| | | | |
|---|---|---|---|
| 2017/0118484 A1 | 4/2017 | Maeda et al. | |
| 2019/0098304 A1 | 3/2019 | Budagavi | |
| 2019/0373286 A1* | 12/2019 | Chuang | H04N 19/159 |
| 2020/0252605 A1* | 8/2020 | Xu | H04N 19/593 |
| 2021/0344969 A1* | 11/2021 | Zhang | H04N 19/184 |
| 2021/0360244 A1* | 11/2021 | Zhang | H04N 19/46 |
| 2022/0014754 A1* | 1/2022 | Liang | H04N 19/46 |
| 2022/0224919 A1* | 7/2022 | Chen | H04N 19/96 |

FOREIGN PATENT DOCUMENTS

| | | | |
|---|---|---|---|
| CN | 105391999 A | 3/2016 | |
| CN | 105532000 A | 4/2016 | |
| CN | 107124608 A | 9/2017 | |
| CN | 109413421 A | 3/2019 | |
| CN | 110798683 A | 2/2020 | |

OTHER PUBLICATIONS

Written Opinion for PCT/CN2020/111246 dated Nov. 9, 2020.
Extended European Search Report dated May 6, 2022 in European Application No. 20856921.0.
English Translation of Written Opinion of the International Searching Authority dated Nov. 9, 2020 in International Application No. PCT/CN2020/111246.
Xiaozhong Xu et al., "Intra block copy improvement on top of Tencent's CfP response", Joint Video Experts Team (JVET) of ITU-T SG 16 WP 3 and ISO/IEC JTC 1/SC 29/WG 11, JVET-J0050, 2018, pp. 1-3 (3 pages total).
Weijia Zhu et al., "CE8-related: Palette Mode Coding", Joint Video Experts Team (JVET) of ITU-T SG 16 WP 3 and ISO/IEC JTC 1/SC 29/WG 11, Document: JVET-N0258-v1, 2019, pp. 1-6 (6 pages total).

* cited by examiner

DATA DECODING METHOD AND APPARATUS, AND DATA CODING METHOD AND APPARATUS

CROSS REFERENCE TO RELATED APPLICATION(S)

This application is a continuation application of International Application No. PCT/CN2020/111246, which claims priority to Chinese Patent Application No. 201910792449.9, filed with the China National Intellectual Property Administration on Aug. 26, 2019, the entire contents of which are incorporated by reference herein.

FIELD

This disclosure relates to the field of computer technologies, and in particular, to a data decoding method and apparatus, a computer-readable storage medium, and a computer device, and a data coding method and apparatus, a computer-readable storage medium, and a computer device.

BACKGROUND

With the development of digital media technologies and computer technologies, videos are applied to various fields, such as mobile communication, network monitoring, and network television. With the improvement of hardware performance and screen resolution, users' demand for high-definition videos is increasing.

When a current coder codes current coding units (CUs), a coding mode is restricted. The current CUs can all only use an intra-frame coding mode or an inter-frame coding mode, and need to frequently switch a coding mode according to a coding mode restriction type. Such a restriction on the coding mode easily leads to poor quality of a decoded image unit that is decoded.

SUMMARY

Embodiments provide a data decoding method and apparatus, a computer-readable storage medium, and a computer device, and a data coding method and apparatus, a computer-readable storage medium, and a computer device.

According to an aspect of example embodiments, a data decoding method may include obtaining coded data corresponding to a current to-be-decoded unit, obtaining a coding mode restriction type corresponding to the current to-be-decoded unit by decoding the coded data, determining a candidate coding mode set corresponding to the current to-be-decoded unit according to the coding mode restriction type, the candidate coding mode set comprising a block copy intra-frame coding mode, selecting a target coding mode from the candidate coding mode set, and decoding the current to-be-decoded unit according to the target coding mode, thereby obtaining corresponding decoded data.

According to an aspect of example embodiments, an apparatus for data decoding may include at least one memory configured to store computer program code, and at least one processor configured to access said computer program code and operate as instructed by said computer program code, said computer program code including first obtaining code configured to cause the at least one processor to obtain coded data corresponding to a current to-be-decoded unit, second obtaining code configured to cause the at least one processor to obtain a coding mode restriction type corresponding to the current to-be-decoded unit by decoding the coded data, determining code configured to cause the at least one processor to determine a candidate coding mode set corresponding to the current to-be-decoded unit according to the coding mode restriction type, the candidate coding mode set comprising a block copy intra-frame coding mode, selecting code configured to cause the at least one processor to select a target coding mode from the candidate coding mode set, and decoding code configured to cause the at least one processor to decode the current to-be-decoded unit according to the target coding mode, thereby obtaining corresponding decoded data.

According to an aspect of example embodiments, a transitory computer-readable storage medium may store computer instructions that, when executed by at least one processor of a device, cause the at least one processor to obtain coded data corresponding to a current to-be-decoded unit, obtain a coding mode restriction type corresponding to the current to-be-decoded unit by decoding the coded data, determine a candidate coding mode set corresponding to the current to-be-decoded unit according to the coding mode restriction type, the candidate coding mode set comprising a block copy intra-frame coding mode, select a target coding mode from the candidate coding mode set, and decode the current to-be-decoded unit according to the target coding mode, thereby obtaining corresponding decoded data.

BRIEF DESCRIPTION OF THE DRAWINGS

In order to describe the technical solutions in the example embodiments of the disclosure more clearly, the following briefly describes the accompanying drawings for describing the example embodiments. Apparently, the accompanying drawings in the following description merely show some embodiments of the disclosure, and a person of ordinary skill in the art may still derive other accompanying drawings from these accompanying drawings without creative efforts.

DETAILED DESCRIPTION

To make the objectives, technical solutions, and advantages of the disclosure clearer, the following further describes the disclosure in detail with reference to the accompanying drawings and the embodiments. It is to be understood that the specific embodiments described herein are merely used for explaining this disclosure but are not intended to limit this disclosure.

It may be understood that the terms "first", "second" and the like used in this disclosure may be used for describing various elements in the disclosure. However, the elements are not limited by the terms unless otherwise specified. The terms are merely used for distinguishing a first element from another element. For example, without departing from the scope of the disclosure, a first flag bit may be referred to as a second flag bit, and similarly, the second flag bit may be referred to as the first flag bit.

Figure 1:
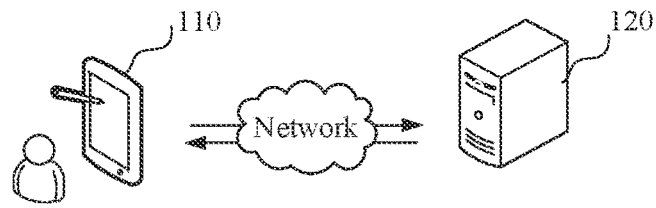
FIG. 1 is a diagram of an application environment of a data decoding method or a data coding method according to an embodiment.

FIG. 1 is a diagram of an application environment of a data decoding method according to an embodiment. Referring to FIG. 1, the data decoding method may be applied to a data decoding system. The data decoding system includes a terminal 110 and a server 120. The terminal 110 and the server 120 are connected by using a network. The terminal 110 may specifically be a desktop terminal or a mobile terminal, and the mobile terminal may specifically be at least one of a mobile phone, a tablet computer, a notebook computer, and the like. The server 120 may be implemented by using an independent server or a server cluster including a plurality of servers.

In another embodiment, FIG. 1 may alternatively represent an environment of a data coding method according to an embodiment. The coding, coding systems, and coding methods described herein may refer to encoding, encoding systems and encoding methods. The data coding method may be applied to a data coding system. Similarly, the data coding system includes a terminal 110 and a server 120.

The data decoding method and the data coding method may be completed in the terminal 110 or the server 120. The terminal 110 may code a coding unit (CU) by using the data coding method provided in the embodiments of this disclosure, and then transmit coded data to the server 120, and may also receive coded data from the server 120 and decode the coded data to obtain a decoded image unit. The server 120 may code the CU. In this case, the data coding method is completed by the server 120. If the server 120 is to decode the coded data, the data decoding method is completed by the server 120. The server 120 may alternatively receive the coded data transmitted by the terminal 110 and then transmit the coded data to a corresponding receiving terminal for decoding by the receiving terminal.

Figure 2:
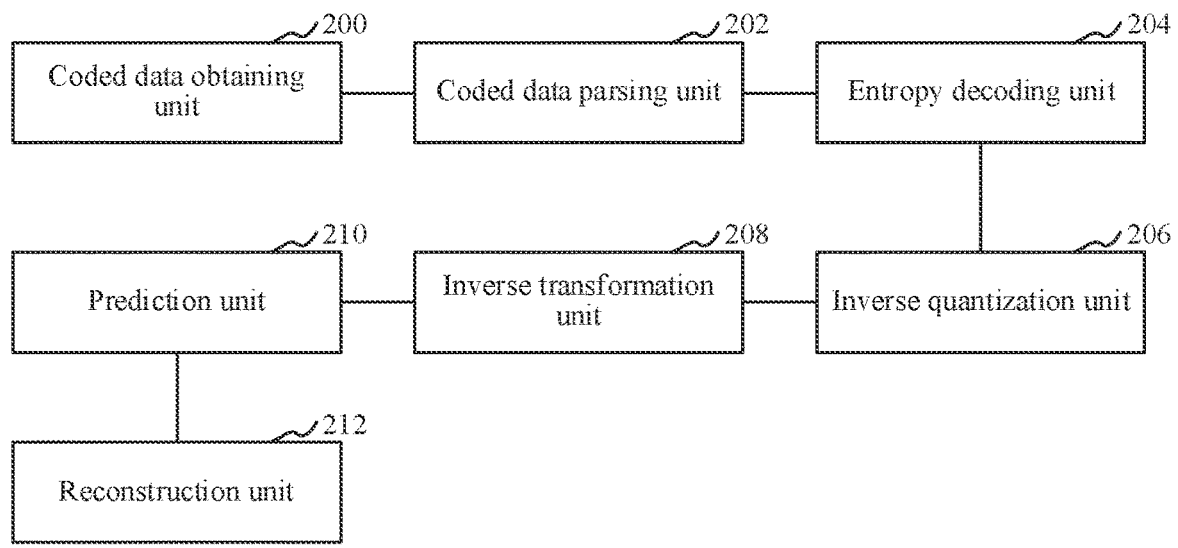
FIG. 2 is a diagram of a decoding framework corresponding to a data decoding method according to an embodiment.

FIG. 2 is a diagram of a decoding framework corresponding to a data decoding method according to an embodiment. In the data decoding method provided in this embodiment of the disclosure, coded data corresponding to one or more coded units may be obtained by using a coded data obtaining unit 200, and the received coded data may be parsed by using a coded data parsing unit 202 to obtain a coding mode restriction type. Next, a corresponding target coding mode is determined according to the coding mode restriction type by using the coded data parsing unit 202, and the coded data is then parsed by using the coded data parsing unit 202 to obtain block vector information and residual information. After an entropy decoding unit 204 performs entropy decoding on the residual information, entropy decoded data is obtained. An inverse quantization unit 206 inversely quantizes the entropy decoded data to obtain inverse quantized data. An inverse transformation unit 208 inversely transforms the inverse quantized data to obtain spatial residual information. A prediction unit 210 determines corresponding prediction information according to the block vector information, which may be performed by obtaining current vector information, determining a position of a reference block according to the current vector information and the block vector information, and determining the prediction information according to the position of the reference block. A reconstruction unit 212 performs reconstruction according to the spatial residual information and the prediction information to obtain a reconstructed image unit. A play storage unit may play or store the reconstructed image unit, or play and store the reconstructed image unit.

Figure 3:
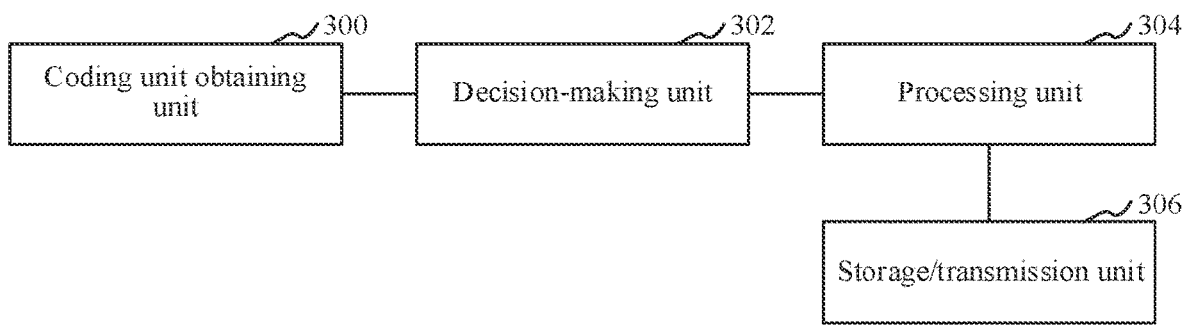
FIG. 3 is a diagram of a coding framework corresponding to a data coding method according to an embodiment.

FIG. 3 is a diagram of a coding framework corresponding to a data coding method according to an embodiment. In the data coding method provided in this embodiment, a CU obtaining unit 300 may obtain a current CU. A decision-making unit 302 may decide a coding mode restriction type of the current CU to obtain a coding mode restriction type corresponding to the current CU. A processing unit 304 codes the current CU according to the coding mode restriction type, determines a target coding mode corresponding to the current CU from candidate coding modes corresponding to the coding mode restriction type, and obtains coded data corresponding to the current CU according to the target coding mode. Finally, a storage/transmission unit 306 stores or transmits the coded data, or stores and transmits the coded data.

It may be understood that the diagram of the coding framework and the diagram of the decoding framework are merely an example, and embodiments are not limited to the data coding method or the data decoding method to which the solution of the disclosure is applied. A specific diagram of a coding framework and diagram of a decoding framework may include more or fewer units than those shown in the figure, or some units may be combined, or different component units may be included. For example, loop filtering may further be performed on the decoded image unit to reduce blocking artifacts of the decoded image unit, thereby improving video quality.

The current CU may be divided into a plurality of sub-CUs, and sizes of the sub-CUs may be set or calculated as required. For example, the sizes of the sub-CUs may all be 8*8 pixels. Alternatively, a dividing manner with a small rate-distortion cost may be selected, by calculating rate-distortion costs corresponding to various dividing manners of sub-CUs, to divide the sub-CUs.

Figure 4:
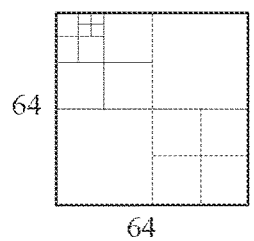
FIG. 4 is a diagram of the division of a current coding unit (CU) according to an embodiment.

FIG. 4 is a diagram of dividing a current CU of 64*64 pixels, according to an embodiment. A block represents a sub-CU. As shown in FIG. 4, sizes of sub-CUs may include 32*32 pixels, 16*16 pixels, 8*8 pixels, and 4*4 pixels. The size of the sub-CU may be alternatively another size, for example, 32*16 pixels or 64*64 pixels. It may be understood that, during decoding, because sub-CUs are in a one-to-one correspondence to to-be-decoded units, sizes of pixels of the to-be-decoded units may also include 32*32 pixels, 16*16 pixels, 8*8 pixels, 4*4 pixels, and the like.

Figure 5A:
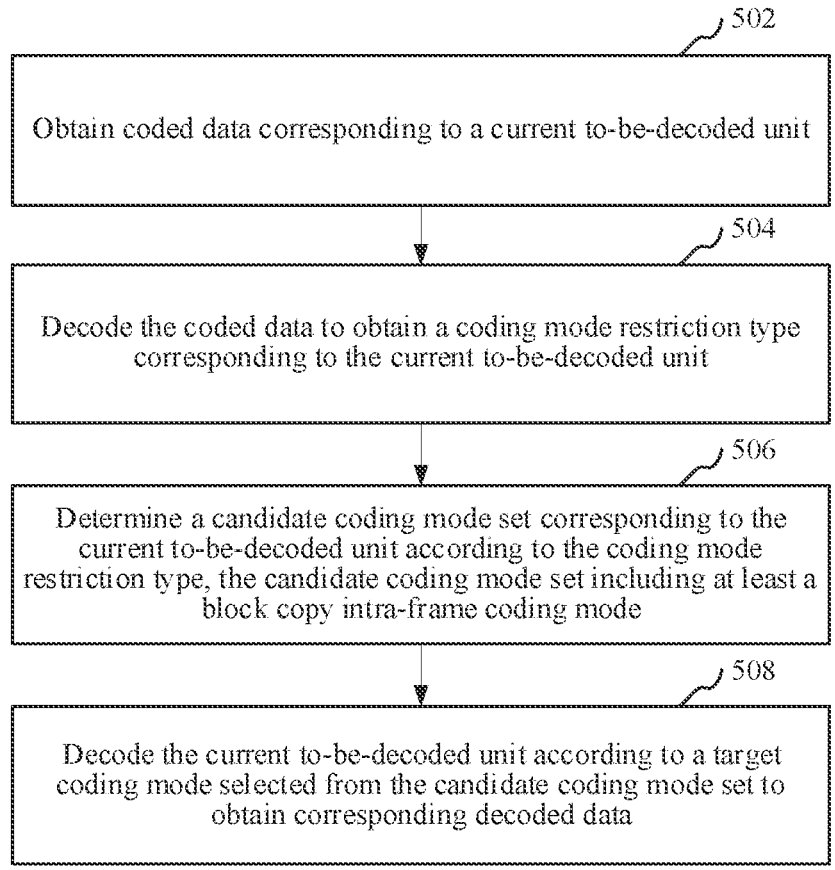
FIG. 5A is a flowchart of a data decoding method according to an embodiment.

FIG. 5A is a flowchart of a data decoding method according to an embodiment. As shown in FIG. 5A, in an embodiment, a data decoding method is provided. This embodiment is mainly described by using an example in which the method is applied to the terminal 110 or the server 120 in FIG. 1. A terminal or a server performing decoding is referred to as a decoder side, and a terminal or a server performing coding is referred to as a coder side. Referring to FIG. 5A, the data decoding method specifically includes the following operations:

In operation 502, the system obtains coded data corresponding to a current to-be-decoded unit.

The current to-be-decoded unit may refer to a decoding unit that is currently decoded, and the decoding unit corresponds to a CU. CUs are sub-blocks of the coding tree unit (CTU). That is, CUs are units that form the CTU. The CTU is a structure of quadtree or binary tree division, and is divided into layers recursively. Finally, a CTU may include several CUs.

Figure 5B:
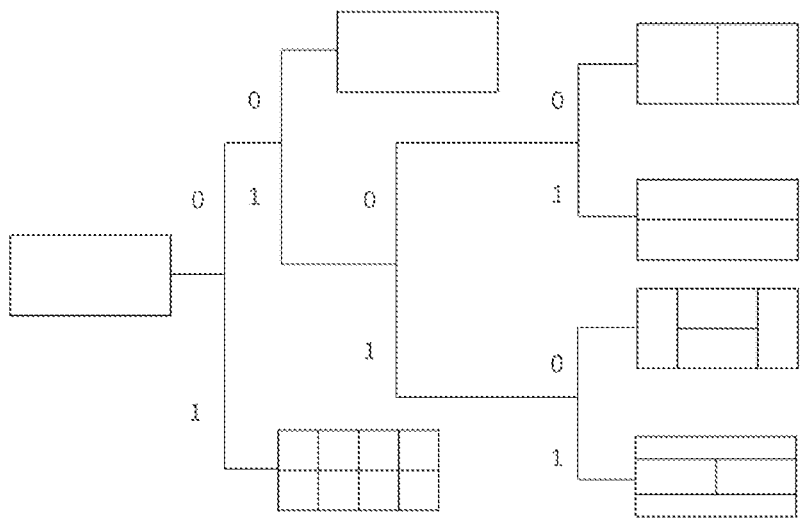
FIG. 5B is a structural diagram of a coding tree unit (CTU) according to an embodiment.

FIG. 5B is a diagram of a CTU according to an embodiment. A small block in each final leaf node in FIG. 5A is a CU, and the CTU is an entire set (an entire large block) formed by CUs. A pixel size of the largest block in FIG. 5B is 16*32. However, generally, a pixel size of a CTU is 64*64 or 128*128. The picture shown in FIG. 5B is provided merely for understanding a tree division structure of the CTU. A number in FIG. 5B indicates whether a node continues to split. If the node continues to split, the number is 1, and if the node does not continue to split, the number is 0. Coding may include at least one of prediction, transformation, quantization, and entropy coding. The coded data is data obtained by coding a CU, and the current CU generates the coded data when being coded. The current CU herein may refer to a CU that is currently coded.

A coding process may include first obtaining the current CU, deciding a coding mode restriction type corresponding to the current CU, the coding mode restriction type corresponding to candidate coding modes, then determining coding mode flag bit information corresponding to the current CU according to the decided coding mode restriction type, determining a target coding mode corresponding to the current CU according to the coding mode restriction type and the flag bit information, and obtaining coded data according to the target coding mode. That is, the coded data includes but is not limited to at least one corresponding syntax element in the coding mode restriction type or the target coding mode.

In operation 504, the system decodes the coded data to obtain a coding mode restriction type corresponding to the current to-be-decoded unit.

The coded data may carry the coding mode restriction type. The coding mode restriction type herein may refer to a type of a coding mode restriction. The coding mode restriction type is used for restricting whether a coding mode of a CU is restricted to a specific coding mode. The coding mode restriction type corresponds to candidate coding modes. That is, after the coded data corresponding to the current to-be-decoded unit is parsed to obtain the corresponding coding mode restriction type, a coding mode of the current to-be-decoded unit may only be at least one of the candidate coding modes corresponding to the coding mode restriction type. During data decoding, the coder side has decided the coding mode restriction type carried in the coded data. The decoder side may parse to obtain the coding mode restriction type carried in the coded data.

In an embodiment, during data coding, the coder side may decide whether the coding mode restriction type is an intra-frame coding mode restriction type or an inter-frame coding mode restriction type. Candidate coding modes corresponding to the intra-frame coding mode restriction type include at least a standard (common) intra-frame coding mode and a block copy intra-frame coding mode. A candidate coding mode corresponding to the inter-frame coding mode restriction type is a common inter-frame coding mode. The common intra-frame coding mode herein may refer to a standard intra-frame coding mode (e.g., an intra-frame coding mode in High Efficiency Video Coding (HEVC)). Similarly, the common inter-frame coding mode may refer to a standard inter-frame coding mode, for example, an inter-frame coding mode in HEVC. The block copy intra-frame coding mode is similar to the common inter-frame coding mode. However, a difference lies in that reference block information of the common inter-frame coding mode is from a reference frame, while reference block information of the block copy intra-frame coding mode is from a current frame.

A flag bit (root_cu_mode) for describing the coding mode restriction type may be added to the coded data. That is, a syntax element for describing the coding mode restriction type is added to the coded data. A value corresponding to the flag bit of the coding mode restriction type may be set to a name corresponding to the coding mode restriction type. For example, if the coding mode restriction type is an intra-frame coding mode restriction type, syntax in the coded data is: root_cu_mode='PRED_Intra_only'.

In an embodiment, during coding, after the coding mode restriction type is determined, because a block copy intra-frame coding mode is added to the candidate coding mode corresponding to the coding mode restriction type, a flag bit may be added, and a corresponding target coding mode is further determined by using a flag bit value corresponding to the flag bit. When the candidate coding mode corresponding to the coding mode restriction type may only be the block copy intra-frame coding mode, there is no need to add a flag bit, and it can be directly determined that the corresponding target coding mode is the block copy intra-frame coding mode.

For example, when the coding mode restriction type is an intra-frame coding mode restriction type, the candidate coding mode includes at least a common intra-frame coding mode and a block copy intra-frame coding mode. Therefore, ibc_flag or flag bit information related to ibc_flag may be added to the coded data. Ibc_flag is flag bit information of the block copy intra-frame coding mode in the current CU. Because the coding mode restriction type is the intra-frame coding mode restriction type, and the intra-frame coding mode restriction type includes the block copy intra-frame coding mode, ibc_flag or the flag bit information related to ibc_flag may be added to the coded data. When a coding mode in the intra-frame coding mode restriction type is a common intra-frame coding mode, ibc_flag=0. When the coding mode in the intra-frame coding mode restriction type is the block copy intra-frame coding mode, ibc_flag=1. When the coding mode restriction type is an inter-frame coding mode restriction type, the inter-frame coding mode restriction type is a common inter-frame coding mode, and the syntax in the coded data is: root_cu_mode='PRED_Inter_only'. Because a coding mode restriction type of the current CU is an inter-frame coding mode restriction type, a coding mode of the current CU may only be a common inter-frame coding mode, and the flag bit information ibc_flag of the block copy intra-frame coding mode does not need to be added to the coded data. Instead, a syntax element corresponding to the common inter-frame coding mode is directly added to the coded data. For example, skip_flag is added to the coded data.

Further, when the coding mode restriction type is a block copy intra-frame coding mode restriction type, the coding mode of the current CU may only be a block copy intra-frame coding mode. Therefore, the flag bit information ibc_flag of the block copy intra-frame coding mode does not need to be transmitted or decoded. In this case, the syntax in the coded data is: root_cu_mode='PRED_Ibc_only'.

In this embodiment, the coding mode restriction type may alternatively be a common intra-frame coding mode restriction type. A coding mode of the common intra-frame coding mode restriction type may only be a common intra-frame coding mode. Therefore, ibc_flag does not need to be added as a syntax element to the coded data.

In an embodiment, during data coding, the coding mode restriction type may be decided as an intra-frame coding mode restriction type, an inter-frame coding mode restriction type, or a block copy intra-frame coding mode restriction type. A candidate coding mode corresponding to the intra-frame coding mode restriction type is a common intra-frame coding mode. Candidate coding modes corresponding to the inter-frame coding mode restriction type include at least a common inter-frame coding mode and a block copy intra-frame coding mode. A candidate coding mode corresponding to the block copy intra-frame coding mode restriction type is a block copy intra-frame coding mode.

When the coding mode restriction type is the intra-frame coding mode restriction type, in this case, the coding mode of the current CU may only be a common intra-frame coding mode, and therefore, the flag bit information ibc_flag of the block copy intra-frame coding mode restriction type does not need to be transmitted, and a syntax element corresponding to the common intra-frame coding mode is directly added to the coded data.

When the coding mode restriction type is the inter-frame coding mode restriction type, in this case, the coding mode of the current CU may be a common inter-frame coding mode or a block copy intra-frame coding mode, and therefore, intra-frame block copy flag bit information ibc_flag may be transmitted. The common inter-frame coding mode and the block copy intra-frame coding mode are specifically distinguished through a value corresponding to ibc_flag. For example, if ibc_flag=0, it indicates that the coding mode is the common inter-frame coding mode, and if ibc_flag=1, it indicates that the coding mode is the block copy intra-frame coding mode.

However, when the coding mode restriction type is the block copy intra-frame coding mode restriction type, the coding mode of the current CU may only be a block copy intra-frame coding mode. Therefore, the flag bit information ibc_flag of the block copy intra-frame coding mode does not need to be transmitted or decoded. In this embodiment, the coding mode restriction type may alternatively be a common inter-frame coding mode restriction type. A coding mode of the common inter-frame coding mode restriction type may only be a common inter-frame coding mode. Therefore, ibc_flag also does not need to be added as a syntax element to the coded data.

Therefore, during data decoding, when the coded data corresponding to the current to-be-decoded unit is obtained, the coded data may be parsed to obtain the coding mode restriction type in the coded data. Specifically, the coding mode restriction type may be obtained by parsing the syntax in the coded data by a decoder. For example, the syntax in the coded data is: root_cu_mode='PRED_Inter_only', and the coding mode restriction type obtained through parsing by the decoder is an inter-frame coding mode restriction type.

In an embodiment, during coded data processing, the coding mode restriction type may be decided as an intra-frame coding mode restriction type, an inter-frame coding mode restriction type, or a block copy intra-frame coding mode restriction type. The intra-frame coding mode restriction type, the inter-frame coding mode restriction type, and the block copy intra-frame coding mode restriction type are independent of each other. A candidate coding mode corresponding to the intra-frame coding mode restriction type is a common intra-frame coding mode. A candidate coding mode corresponding to the inter-frame coding mode restriction type is a common inter-frame coding mode. A candidate coding mode corresponding to the block copy intra-frame coding mode restriction type is a block copy intra-frame coding mode. In this case, during coding, a flag bit, for example, the flag bit information ibc_flag of the block copy intra-frame coding mode, does not need to be added. Therefore, during decoding, no flag bit needs to be read.

In an embodiment, during coded data processing, a finally decided quantity of the coding mode restriction types may be decided by a hardware manufacturer. Examples of a specific quantity of the coding mode restriction types in this disclosure are not used as a limited scope of this disclosure. For example, in some embodiments, there may be two types of coding mode restriction types, which may be specifically a combination of an intra-frame coding mode restriction type and an inter-frame coding mode restriction type, or a combination of one of an intra-frame coding mode restriction type and an inter-frame coding mode restriction type and a block copy intra-frame coding mode restriction type, or the like.

In operation 506, the system determines a candidate coding mode set corresponding to the current to-be-decoded unit according to the coding mode restriction type, the candidate coding mode set including at least a block copy intra-frame coding mode.

Specifically, after parsing the coded data to obtain the coding mode restriction type, the decoder side determines, according to the coding mode restriction type, whether a coding mode flag bit related to the block copy intra-frame coding mode is to be read. If the coding mode flag bit is to be read, the decoder side reads the coding mode flag bit related to the block copy intra-frame coding mode, and then determines the candidate coding mode set according to the coding mode flag bit. The candidate coding mode set includes at least a block copy intra-frame coding mode, and may further include one of a common intra-frame coding mode and a common inter-frame coding mode. For example, when the coding mode restriction type is an intra-frame coding mode restriction type, a corresponding candidate coding mode set includes at least a block copy intra-frame coding mode and a common intra-frame coding mode. Alternatively, in another example, when the coding mode restriction type is an inter-frame coding mode restriction type, a corresponding candidate coding mode set includes at least a block copy intra-frame coding mode and a common inter-frame coding mode.

In an embodiment, the target coding mode may be selected from the candidate coding mode set according to a value corresponding to the coding mode flag bit. If no coding mode flag bit needs to be read, the target coding mode can be directly determined. A flag bit related to the block copy intra-frame coding mode may be the flag bit information ibc_flag of the block copy intra-frame coding mode. For example, if the coding mode restriction type obtained by parsing the coded data is an intra-frame coding mode restriction type, root_cu_mode='PRED_Intra_only', and it is then determined whether the flag bit ibc_flag related to the block copy intra-frame coding mode may be read from the coded data. If no ibc_flag needs to be read, it can be directly determined that a coding mode corresponding to the intra-frame coding mode restriction type may only be a common intra-frame coding mode, and the target coding mode corresponding to the current to-be-decoded unit is the common intra-frame coding mode. If ibc_flag should be read, it indicates that the coding mode corresponding to the intra-frame coding mode restriction type may be the common intra-frame coding mode or a block copy intra-frame coding mode, and a value of the flag bit ibc_flag further may be read to determine the target coding mode. For example, if the value of ibc_flag is 0, the target coding mode is the common intra-frame coding mode, and if the value of ibc_flag is 1, the target coding mode is the block copy intra-frame coding mode.

In another example, the coding mode restriction type obtained by parsing the coded data by the decoder side is a block copy intra-frame coding mode restriction type, root_cu_mode='PRED_Ibc_only'. Because it is learned in advance that a coding mode corresponding to the block copy intra-frame coding mode restriction type may only be a block copy intra-frame coding mode, the flag bit ibc_flag related to the block copy intra-frame coding mode does not need to be read. Therefore, it can be directly determined that the target coding mode corresponding to the current to-be-decoded unit may only be the block copy intra-frame coding mode.

In operation 508, the system decodes the current to-be-decoded unit according to the target coding mode selected from the candidate coding mode set to obtain corresponding decoded data.

After determining the target coding mode corresponding to the current to-be-decoded unit, the decoder side decodes the current to-be-decoded unit according to the target coding mode, which may be decoding the current to-be-decoded unit according to a decoding manner corresponding to the target coding mode to obtain the corresponding decoded data. The decoding may include at least one of prediction, inverse transformation, inverse quantization, and entropy decoding, and may be determined according to a coding process.

In an embodiment, when the target coding mode is a block copy intra-frame coding mode, the coded data may be parsed to obtain block vector information and residual information. Next, entropy decoding is performed on the residual information to obtain entropy decoded data. Inverse quantization is then performed on the entropy decoded data to obtain inverse quantized data, and inverse transformation is further performed on the inverse quantized data to obtain spatial residual information. Further, corresponding prediction information is determined according to the block vector information, which may be performed by obtaining current vector information, determining a position of a reference block according to the current vector information and the block vector information, and determining the prediction information according to the position of the reference block. Next, reconstruction may be performed according to the spatial residual information and the prediction information to obtain a reconstructed image unit, so as to obtain the decoded data. Further, after the reconstructed image unit is obtained, to ensure the quantity of the reconstructed image unit, processing such as sampling processing may be further performed on the reconstructed image unit. The sampling processing may be upsampling processing, and a final image unit is further obtained.

According to the data decoding method, coded data corresponding to a current to-be-decoded unit is obtained; a coding mode restriction type corresponding to the current to-be-decoded unit is obtained by parsing the coded data; a target coding mode corresponding to the current to-be-decoded unit is determined according to the coding mode restriction type, the target coding mode being one of candidate coding modes, the candidate coding modes including a block copy intra-frame coding mode; and the current to-be-decoded unit is decoded according to the target coding mode to obtain corresponding decoded data. Therefore, during decoding, in the coding mode restriction type, decoding is flexibly performed according to the target coding mode, thereby obtaining accurate decoded data corresponding to the to-be-decoded unit.

Figure 6:
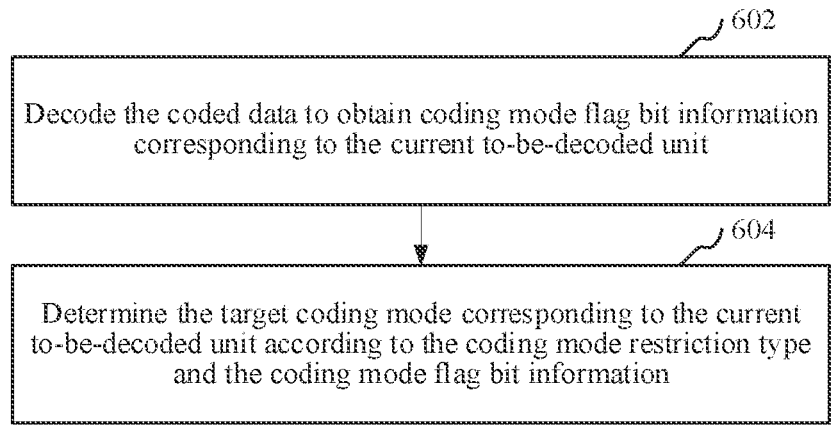
FIG. 6 is a flowchart of a method for selecting a target coding mode according to an embodiment.

FIG. 6 is a flowchart of a method for selecting a target coding mode according to an embodiment. In an embodiment, as shown in FIG. 6, the selecting the target coding mode from the candidate coding mode set may include the following operations.

In operation 602, the system decodes the coded data to obtain coding mode flag bit information corresponding to the current to-be-decoded unit.

The coding mode flag bit information may refer to the flag bit related to the block copy intra-frame coding mode. That is, a syntax element for describing the block copy intra-frame coding mode is added to the coded data. The target coding mode corresponding to the current to-be-decoded unit may be further determined according to a value corresponding to the coding mode flag bit information.

The coded data may be parsed by the decoder to obtain the coding mode restriction type corresponding to the current to-be-decoded unit, and it is then determined, according to the coding mode restriction type, whether the coding mode flag bit information related to the block copy intra-frame coding mode is to be read. If the coding mode flag bit information should be read, the coding mode flag bit information corresponding to the current to-be-decoded unit, for example, ibc_flag, is read.

The flag bit information ibc_flag of the block copy intra-frame coding mode may refer to that the flag bit information ibc_flag of the block copy intra-frame coding mode exists on the premise that the candidate coding mode corresponding to the coding mode restriction type includes the block copy intra-frame coding mode. Therefore, the target coding mode corresponding to the current to-be-decoded unit can be determined according to a value corresponding to ibc_flag. For example, if ibc_flag=1 is parsed, the target coding mode corresponding to the current to-be-decoded unit is the block copy intra-frame coding mode.

During coding, when the coding mode restriction type is a block copy intra-frame coding mode restriction type, because a coding mode corresponding to the block copy intra-frame coding mode restriction type may only be a block copy intra-frame coding mode, the flag bit information ibc_flag of the block copy intra-frame coding mode does not need to be added to the coded data. Therefore, when the coding mode restriction type obtained through decoding is the block copy intra-frame coding mode restriction type, no coding mode flag bit information ibc_flag related to the block copy intra-frame coding mode needs to be read.

In an embodiment, the syntax in the coded data may be:
root_cu_mode='PRED_Intra_only';
ibc_flag=1.

The coding mode restriction type that is obtained by decoding the coded data by the decoder and that is corresponding to the current to-be-decoded unit, is an intra-frame coding mode restriction type. Because it is learned in advance that a coding mode corresponding to the intra-frame coding mode restriction type may be a common intra-frame coding mode or a block copy intra-frame coding mode, the decoder may read the flag bit information ibc_flag of the block copy intra-frame coding mode in the coded data, and further read the value corresponding to the flag bit information ibc_flag of the block copy intra-frame coding mode to determine the target coding mode. When the value corresponding to ibc_flag is parsed to 1, it can be determined that the target coding mode corresponding to the current to-be-decoded unit is the block copy intra-frame coding mode.

In operation 604, the system determines the target coding mode corresponding to the current to-be-decoded unit according to the coding mode restriction type and the coding mode flag bit information.

After the decoder side parses and obtains the coding mode restriction type corresponding to the current to-be-decoded unit and the coding mode flag bit information, the decoder side may determine the target coding mode corresponding to the current to-be-decoded unit according to the coding mode flag bit information. Specifically, the target coding mode corresponding to the current to-be-decoded unit may be determined according to the value corresponding to the flag bit information.

In an embodiment, the syntax in the coded data may be as follows;
root_cu_mode='PRED_Inter_only';
ibc_flag=0.

The decoder decodes the coded data to obtain that the coding mode restriction type corresponding to the current to-be-decoded unit is an inter-frame coding mode restriction type. Because it is learned in advance that the coding mode corresponding to the inter-frame coding mode restriction type may be a common inter-frame coding mode restriction type or a block copy intra-frame coding mode, the decoder may read the flag bit information ibc_flag of the block copy intra-frame coding mode, and further read the value corresponding to the flag bit information ibc_flag of the block copy intra-frame coding mode to determine the final target coding mode. If ibc_flag is parsed to 0, it can be determined that the target coding mode corresponding to the current to-be-decoded unit is the common inter-frame coding mode.

In another embodiment, the syntax in the coded data may be:
root_cu_mode='PRED_Inter_only';
skip_flag.

The coding mode restriction type that is obtained by decoding the coded data by the decoder and that is corresponding to the current to-be-decoded unit is an inter-frame coding mode restriction type. Because it is learned in advance that a coding mode corresponding to the inter-frame coding mode restriction type may only be a common inter-frame coding mode, and no flag bit information ibc_flag of the block copy intra-frame coding mode exists in the coded data, the decoder does not need to read ibc_flag. The coded data may be parsed to obtain that flag bit information of a skip mode is skip_flag. In this embodiment, skip_flag is coding mode flag bit information unique to the common inter-frame coding mode.

In another embodiment, the syntax in the coded data may be:
root_cu_mode='PRED_Ibc_only'.

The coding mode restriction type that is obtained by decoding the coded data by the decoder and that is corresponding to the current to-be-decoded unit is a block copy intra-frame coding mode restriction type. Because it is learned in advance that a coding mode corresponding to the block copy intra-frame coding mode restriction type may only be a block copy intra-frame coding mode, the decoder does not need to read the flag bit information ibc_flag of the block copy intra-frame coding mode, and it can be directly determined that the target coding mode corresponding to the current to-be-decoded unit is the block copy intra-frame coding mode.

Figure 7:
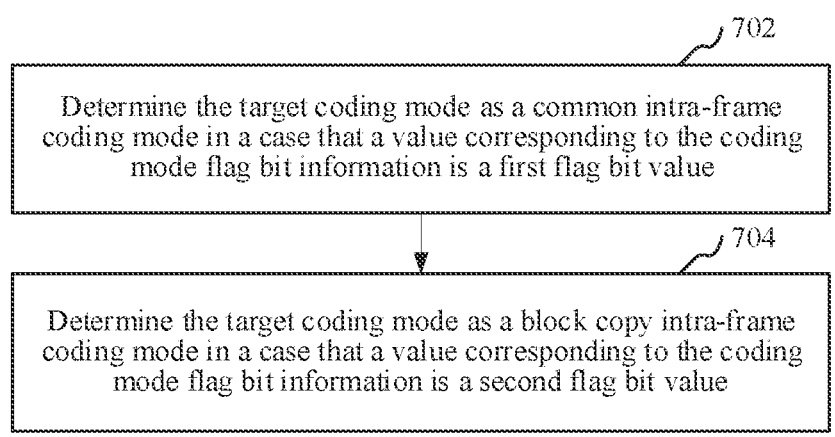
FIG. 7 is a flowchart of a method for selecting a target coding mode according to an embodiment.

FIG. 7 is a flowchart of a method for selecting a target coding mode according to an embodiment. In an embodiment, as shown in FIG. 7, the coding mode restriction type is an intra-frame coding mode restriction type, and the determining the target coding mode corresponding to the current to-be-decoded unit according to the coding mode restriction type and the coding mode flag bit information includes the following operations:

In operation 702, the system determines the target coding mode as a common intra-frame coding mode when a value corresponding to the coding mode flag bit information is a first flag bit value.

In operation 704, the system determines the target coding mode as a block copy intra-frame coding mode when a value corresponding to the coding mode flag bit information is a second flag bit value.

When the coding mode restriction type is the intra-frame coding mode restriction type, in this case, candidate coding modes corresponding to the intra-frame coding mode restriction type include the common intra-frame coding mode and the block copy intra-frame coding mode. After decoding the coded data corresponding to the current to-be-decoded unit and obtaining the coding mode restriction type corresponding to the current to-be-decoded unit, the decoder may determine the target coding mode according to the read value corresponding to the coding mode flag bit information in the current coded data. The target coding mode is one of the candidate coding modes corresponding to the coding mode restriction type. Specifically, the target coding mode may be determined according to the flag bit value corresponding to the coding mode flag bit information obtained through parsing by the decoder.

For example, the decoder can learn the coding mode restriction type by parsing a syntax element root_cu_mode in the coded data, and can learn, when reading a syntax element ibc_flag in the coded data, that the coding mode restriction type includes a block copy intra-frame coding mode, and determine, by reading a flag bit value corresponding to the syntax element ibc_flag, whether the coding mode is a block copy intra-frame coding mode or a common intra-frame coding mode.

The first flag bit value and the second flag bit value herein are values corresponding to the coding mode flag bit information, and are used for determining the target coding mode from the candidate coding modes corresponding to the coding mode restriction type. The first flag bit value herein may be used for determining the target coding mode as the common intra-frame coding mode. That is, when the decoder reads that the value corresponding to the coding mode flag bit information is the first flag bit value, the target coding mode is the common intra-frame coding mode. The second flag bit value herein may be used for determining the target coding mode as the block copy intra-frame coding mode. That is, when the decoder reads that the value corresponding to the coding mode flag bit information is the second flag bit value, the target coding mode is the block copy intra-frame coding mode. The first flag bit value and the second flag bit value may be specifically set according to an actual requirement.

For example, if the coding mode flag bit information is flag bit information ibc_flag of the block copy intra-frame coding mode, and the first flag bit value may be set to 0 to indicate that the coding mode is a common intra-frame coding mode, the syntax in the coded data is: ibc_flag=0, the coding mode restriction type of the current to-be-decoded unit obtained through parsing by the decoder is the intra-frame coding mode restriction type, and the target coding mode is the common intra-frame coding mode. Similarly, the second flag bit value may be set to 1 to indicate that the coding mode is the block copy intra-frame coding mode, the syntax in the coded data is: ibc_flag=1, the coding mode restriction type of the current to-be-decoded unit obtained through parsing by the decoder is the intra-frame coding mode restriction type, and the target coding mode is the block copy intra-frame coding mode.

In an embodiment, during coding, if the syntax in the coded data is set as:
root_cu_mode='PRED_Intra_only',
ibc_flag=0,
the coding mode restriction type obtained by decoding the coded data by the decoder is an intra-frame coding mode restriction type, and candidate coding modes of the intra-frame coding mode restriction type include a block copy intra-frame coding mode. However, because a flag bit value that is obtained through parsing and that is corresponding to the flag bit information ibc_flag of the block copy intra-frame coding mode is 0, it can be determined that the target coding mode is a common intra-frame coding mode.

Similarly, if the syntax in the coded data is set as:
root_cu_mode='PRED_Intra_only',
ibc_flag=1,
the coding mode restriction type obtained by decoding the coded data by the decoder is an intra-frame coding mode restriction type, and candidate coding modes of the intra-frame coding mode restriction type include a block copy intra-frame coding mode. However, because a flag bit value that is read and that is corresponding to the flag bit information ibc_flag of the block copy intra-frame coding mode is 1, it can be determined that the target coding mode is a block copy intra-frame coding mode.

In another embodiment, if the syntax in the coded data is:
root_cu_mode='PRED_Inter_only',
the coding mode restriction type obtained by decoding the coded data by the decoder is an inter-frame coding mode restriction type, and flag bit information ibc_flag of the block copy intra-frame coding mode is not parsed from the coded data. Therefore, a coding mode of the inter-frame coding mode restriction type may only be a common inter-frame coding mode, and it can be determined that the target coding mode is a common inter-frame coding mode.

In still another embodiment, if the syntax in the coded data is:
root_cu_mode='PRED_Ibc_only',
the coding mode restriction type obtained by decoding the coded data by the decoder is a block copy intra-frame coding mode restriction type. Though flag bit information ibc_flag of the block copy intra-frame coding mode is not parsed from the coded data, a coding mode of the block copy intra-frame coding mode restriction type may only be a block copy intra-frame coding mode, and therefore, it can be determined that the target coding mode is a block copy intra-frame coding mode.

In still another embodiment, if the syntax in the coded data is:
root_cu_mode='PRED_NormalIntra_only',
the coding mode restriction type obtained by decoding the coded data by the decoder is a common intra-frame coding mode restriction type, and flag bit information ibc_flag of the block copy intra-frame coding mode is not parsed from the coded data. Therefore, a coding mode of the common intra-frame coding mode restriction type may only be a common intra-frame coding mode, and it can be determined that the target coding mode is a common intra-frame coding mode.

Figure 8:
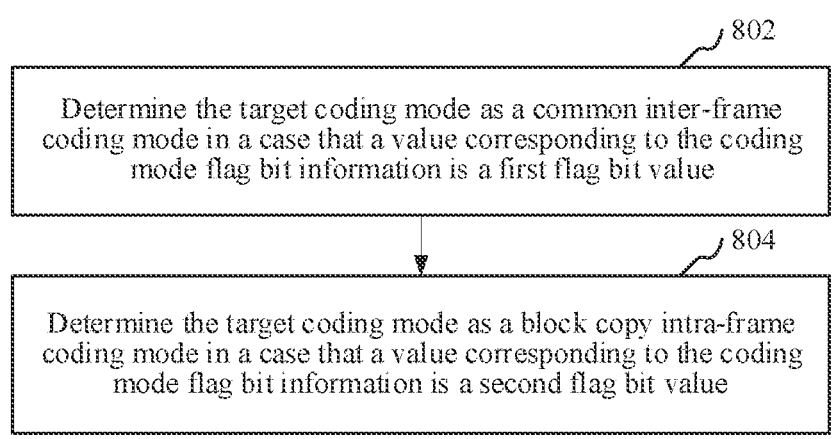
FIG. 8 is a flowchart of a method for selecting a target coding mode according to an embodiment.

FIG. 8 is a flowchart of a method for selecting a target coding mode according to an embodiment. In an embodiment, as shown in FIG. 8, the coding mode restriction type is an inter-frame coding mode restriction type, and the determining the target coding mode corresponding to the current to-be-decoded unit according to the coding mode restriction type and the coding mode flag bit information includes the following operations:

In operation 802, the system determines the target coding mode as a common inter-frame coding mode when a value corresponding to the coding mode flag bit information is a first flag bit value.

In operation 804, the system determines the target coding mode as a block copy intra-frame coding mode when a value corresponding to the coding mode flag bit information is a second flag bit value.

When the coding mode restriction type is the inter-frame coding mode restriction type, in this case, candidate coding modes corresponding to the inter-frame coding mode restriction type include at least the common inter-frame coding mode and the block copy intra-frame coding mode. After decoding the coded data corresponding to the current to-be-decoded unit and obtaining the coding mode restriction type corresponding to the current to-be-decoded unit, the decoder may determine the target coding mode according to the parsed coding mode flag bit information in the current coded data. The target coding mode is one of the candidate coding modes corresponding to the coding mode restriction type.

The target coding mode is determined according to a flag bit value corresponding to the coding mode flag bit information parsed by the decoder. For example, the decoder can learn the coding mode restriction type by parsing a syntax element root_cu_mode in the coded data, and can learn, by parsing a syntax element ibc_flag in the coded data, that the coding mode restriction type includes a block copy intra-frame coding mode, and determine, by using a flag bit value corresponding to the syntax element ibc_flag, whether the coding mode is a block copy intra-frame coding mode or a common inter-frame coding mode.

The first flag bit value and the second flag bit value herein are values corresponding to the coding mode flag bit information, and are used for determining the target coding mode from the candidate coding modes corresponding to the coding mode restriction type. The first flag bit value herein may be used for determining the target coding mode as the common inter-frame coding mode. That is, when the decoder parses that the value corresponding to the coding mode flag bit information is the first flag bit value, the target coding mode is the common inter-frame coding mode. The second flag bit value herein may be used for determining the target coding mode as the block copy intra-frame coding mode. That is, when the decoder parses that the value corresponding to the coding mode flag bit information is the second flag bit value, the target coding mode is the block copy intra-frame coding mode. The first flag bit value and the second flag bit value may be set according to an actual requirement.

For example, if the coding mode flag bit information is flag bit information ibc_flag of the block copy intra-frame coding mode, and the first flag bit value may be set to 0 to indicate that the coding mode is the common inter-frame coding mode, the syntax in the coded data is: ibc_flag=0, the coding mode restriction type of the current to-be-decoded unit obtained through parsing by the decoder is the inter-frame coding mode restriction type, and the target coding mode is the common inter-frame coding mode. Similarly, the second flag bit value may be set to 1 to indicate that the coding mode is the block copy intra-frame coding mode, the syntax in the coded data is: ibc_flag=1, the coding mode restriction type of the current to-be-decoded unit obtained through parsing by the decoder is the inter-frame coding mode restriction type, and the target coding mode is the block copy intra-frame coding mode.

In an embodiment, during coding, if the syntax in the coded data is set as:
root_cu_mode='PRED_Inter_only',
ibc_flag=0,
the coding mode restriction type obtained by decoding the coded data by the decoder is an inter-frame coding mode restriction type, and candidate coding modes of the inter-frame coding mode restriction type include a block copy intra-frame coding mode. However, because a flag bit value that is obtaining through parsing and that is corresponding to flag bit information ibc_flag of the block copy intra-frame coding mode is 0, it can be determined that the target coding mode is a common inter-frame coding mode.

Similarly, if the syntax in the coded data is set as:
root_cu_mode='PRED_Inter_only',
ibc_flag=1,
the coding mode restriction type obtained by decoding the coded data by the decoder is an inter-frame coding mode restriction type, and candidate coding modes of the inter-frame coding mode restriction type include a block copy intra-frame coding mode. However, because a flag bit value that is obtained through parsing and that is corresponding to flag bit information ibc_ flag of the block copy intra-frame coding mode is 1, it can be determined that the target coding mode is a block copy intra-frame coding mode.

In an embodiment, if the syntax in the coded data is root_cu_mode='PRED_Intra_only',
the coding mode restriction type obtained by decoding the coded data by the decoder is an intra-frame coding mode restriction type, and flag bit information ibc_flag of the block copy intra-frame coding mode is not parsed from the coded data. Therefore, a coding mode of the intra-frame coding mode restriction type may only be a common intra-frame coding mode, and it can be determined that the target coding mode is a common intra-frame coding mode.

In an embodiment, if the syntax in the coded data is:
root_cu_mode='PRED_Ibc_only',
the coding mode restriction type obtained by decoding the coded data by the decoder is a block copy intra-frame coding mode restriction type. Though flag bit information ibc_flag of the block copy intra-frame coding mode is not parsed from the coded data, a coding mode of the block copy intra-frame coding mode restriction type may only be a block copy intra-frame coding mode, and therefore, it can be determined that the target coding mode is a block copy intra-frame coding mode.

In an embodiment, if the syntax in the coded data is:
root_cu_mode='PRED_NormalInter_only',
the coding mode restriction type obtained by decoding the coded data by the decoder is a common inter-frame coding mode restriction type, and flag bit information ibc_flag of the block copy intra-frame coding mode is not parsed from the coded data. Therefore, a coding mode of the common inter-frame coding mode restriction type may only be a common inter-frame coding mode, and it can be determined that the target coding mode is a common inter-frame coding mode.

In an embodiment, the coding mode restriction type is the block copy intra-frame coding mode restriction type, and the selecting the target coding mode from the candidate coding mode set includes directly determining the target coding mode corresponding to the current to-be-decoded unit as a block copy intra-frame coding mode.

Because a coding mode corresponding to the block copy intra-frame coding mode restriction type may only be the block copy intra-frame coding mode, after the decoder decodes the coded data corresponding to the current to-be-decoded unit, the coding mode restriction type corresponding to the current to-be-decoded unit is obtained. When the coding mode restriction type is the block copy intra-frame coding mode restriction type, it can be directly determined that the target coding mode corresponding to the current to-be-decoded unit is the block copy intra-frame coding mode. Because a coding mode of the block copy intra-frame coding mode restriction type may only be the block copy intra-frame coding mode, flag bit information ibc_flag of the block copy intra-frame coding mode used for describing the block copy intra-frame coding mode does not need to be added to the coded data. That is, when the coding mode restriction type that is obtained through parsing by the decoder and that is corresponding to the current to-be-decoded unit is the block copy intra-frame coding mode restriction type, it can be directly determined that the target coding mode corresponding to the current to-be-decoded unit is the block copy intra-frame coding mode.

In an embodiment, if the syntax in the coded data is:
root_cu_mode='PRED_Ibc_only',
the coding mode restriction type obtained by decoding the coded data by the decoder is a block copy intra-frame coding mode restriction type. Though flag bit information ibc_flag of the block copy intra-frame coding mode is not parsed from the coded data, a coding mode of the block copy intra-frame coding mode restriction type may only be a block copy intra-frame coding mode, and therefore, it can be directly determined that the target coding mode is the block copy intra-frame coding mode.

In an embodiment, the data decoding method further includes determining the target coding mode corresponding to the current to-be-decoded unit as a common intra-frame coding mode when the coding mode restriction type obtained through decoding is a common intra-frame coding mode restriction type.

When the coding mode restriction type is the common intra-frame coding mode restriction type, in this case, a coding mode corresponding to the common intra-frame coding mode restriction type may only be the common intra-frame coding mode. Therefore, after the decoder decodes the coded data corresponding to the current to-be-decoded unit, the coding mode restriction type corresponding to the current to-be-decoded unit is obtained. When the coding mode restriction type is the common intra-frame coding mode restriction type, it can be directly determined that the target coding mode corresponding to the current to-be-decoded unit is the common intra-frame coding mode. Because the coding mode of the common intra-frame coding mode restriction type may only be the common intra-frame coding mode, flag bit information ibc_flag of the block copy intra-frame coding mode used for describing a block copy intra-frame coding mode does not need to be added to the coded data. That is, when the coding mode restriction type that is obtained through parsing by the decoder and that is corresponding to the current to-be-decoded unit is the common intra-frame coding mode restriction type, it can be directly determined that the target coding mode corresponding to the current to-be-decoded unit is the common intra-frame coding mode.

In an embodiment, if the syntax in the coded data is:
root_cu_mode='PRED_NormalIntra_only',
the coding mode restriction type obtained by decoding the coded data by the decoder is a common intra-frame coding mode restriction type, and flag bit information ibc_flag of the block copy intra-frame coding mode is not parsed from the coded data. Therefore, a coding mode of the common intra-frame coding mode restriction type may only be a common intra-frame coding mode, and it can be directly determined that the target coding mode is the common intra-frame coding mode.

In an embodiment, the data decoding method further includes determining the target coding mode corresponding to the current to-be-decoded unit as a common inter-frame coding mode when the coding mode restriction type obtained through decoding is a common inter-frame coding mode restriction type.

When the coding mode restriction type is the common inter-frame coding mode restriction type, in this case, a coding mode corresponding to the common inter-frame coding mode restriction type may only be the common inter-frame coding mode. Therefore, after the decoder decodes the coded data corresponding to the current to-be-decoded unit, the coding mode restriction type corresponding to the current to-be-decoded unit is obtained. When the coding mode restriction type is the common inter-frame coding mode restriction type, it can be directly determined that the target coding mode corresponding to the current to-be-decoded unit is the common inter-frame coding mode. Because the coding mode corresponding to the common inter-frame coding mode restriction type may only be the common inter-frame coding mode, flag bit information ibc_flag of the block copy intra-frame coding mode used for describing a block copy intra-frame coding mode does not need to be added to the coded data. That is, when the coding mode restriction type that is obtained through parsing by the decoder and that is corresponding to the current to-be-decoded unit is the common inter-frame coding mode restriction type, it can be directly determined that the target coding mode corresponding to the current to-be-decoded unit is the common inter-frame coding mode.

In an embodiment, if the syntax in the coded data is:
root_cu_mode='PRED_NormalInter_only',
the coding mode restriction type obtained by decoding the coded data by the decoder is a common inter-frame coding mode restriction type, and flag bit information ibc_flag of the block copy intra-frame coding mode is not parsed from the coded data. Therefore, a coding mode of the common inter-frame coding mode restriction type may only be a common inter-frame coding mode, and it can be determined that the target coding mode is the common inter-frame coding mode.

Figure 9:
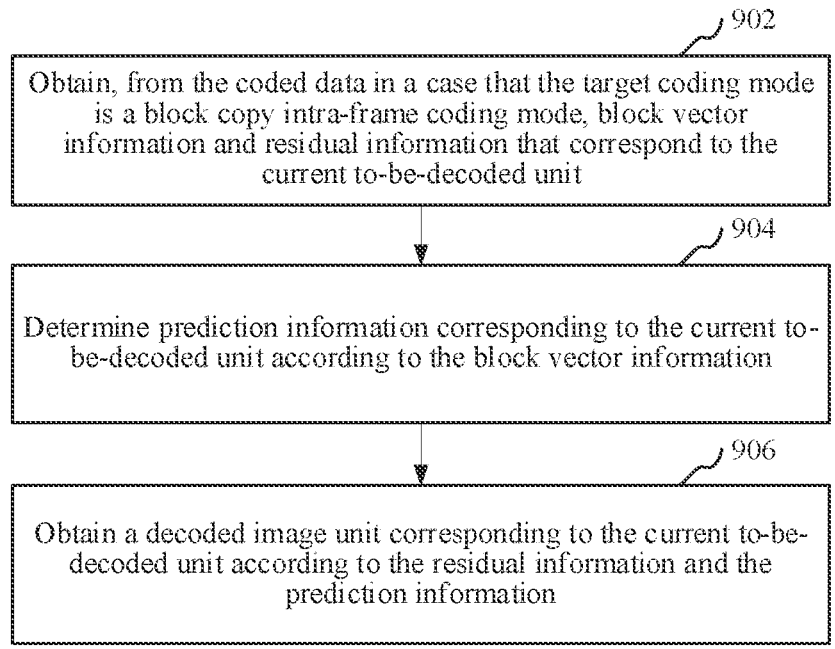
FIG. 9 is a flowchart of a method for decoding decoded data according to an embodiment.

FIG. 9 is a flowchart of a method for decoding decoded data according to an embodiment. In an embodiment, as shown in FIG. 9, the decoding the current to-be-decoded unit according to the target coding mode to obtain corresponding decoded data includes the following operations:

In operation 902, the system obtains, from the coded data when the target coding mode is a block copy intra-frame coding mode, block vector information and residual information that correspond to the current to-be-decoded unit.

The block vector information may refer to information related to a block vector. The block vector is a special term in a block copy intra-frame coding mode, which is similar to the concept of a motion vector (MV) in an inter-frame coding mode. The coded data includes the block vector information, and the decoder may determine a corresponding position of a reference block according to the block vector information. That is, the block vector information is used for pointing to the position of the reference block. When the target coding mode is a block copy intra-frame coding mode, flag bit information ibc_flag of the block copy intra-frame coding mode may or may not exist in the coded data. When the coding mode restriction type is an intra-frame coding mode restriction type or an inter-frame coding mode restriction type, and candidate coding modes corresponding to the intra-frame coding mode restriction type or the inter-frame coding mode restriction type include a block copy intra-frame coding mode, the flag bit information ibc_flag of the block copy intra-frame coding mode exists in the coded data. When the coding mode restriction type is the block copy intra-frame coding mode restriction type, no flag bit information ibc_flag of the block copy intra-frame coding mode exists in the coded data. That is, the decoder does not need to decode the syntax element, but it can be implicitly inferred that ibc_flag is "true".

Specifically, when the target coding mode is the block copy intra-frame coding mode, the decoder decodes the coded data to obtain the block vector information and residual information that correspond to the current to-de-decoded unit.

In operation 904, the system determines prediction information corresponding to the current to-be-decoded unit according to the block vector information.

When the decoder obtains the block vector information through parsing, the block vector information is used for pointing to a position of a reference block. Therefore, the prediction information corresponding to the current to-be-decoded unit may be determined according to the block vector information, which may specifically include obtaining current vector information corresponding to the current to-be-decoded unit, the current vector information being information related to a position of the current to-be-decoded unit, calculating the position of the reference block according to the current vector information and the block vector information; determining a target region having the same size as a region that the current to-be-decoded unit may copy from the position of the reference block, copying a reference pixel value in the target region to a region corresponding to the current to-be-decoded unit, and calculating the prediction information according to an original pixel value in the region corresponding to the current to-be-decoded unit and the copied reference pixel value corresponding to the reference block.

That is, in the coding process, if the coding mode corresponding to the current CU is the block copy intra-frame coding mode and carries the block vector information from the coded data, the block vector information being information used for pointing to a position of a reference block, the reference block is then copied to a current coding region. Subsequently, the residual information is calculated according to an original pixel corresponding to the current CU and a reference pixel corresponding to the reference block and is used for subsequent coding.

In operation 906, the system obtains a decoded image unit corresponding to the current to-be-decoded unit according to the residual information and the prediction information.

Specifically, when the decoder obtains the residual information through parsing, entropy decoding, inverse quantization, and inverse transformation are performed on the residual information to obtain spatial residual information, which may include first performing entropy decoding on the residual information to obtain corresponding entropy decoded data, then performing inverse quantization on the entropy decoded data to obtain inverse quantized data, and further performing inverse transformation on the inverse quantized data to obtain the spatial residual information.

The inverse quantization is an inverse process of quantization. A principle of quantization is expressed by using the following equation:

$$FQ = \text{round}(y/Q\text{step}),$$

where y is a value corresponding to the current CU before quantization is performed, Qstep is a quantization step, and FQ is a quantized value obtained after y is quantized. The round(x) function is used for performing rounding off to an even number on the quantized value, that is, Banker's rounding. A correspondence between a quantization parameter and the quantization step may be specifically set as required. For example, in some video coding standards, for brightness coding, the quantization step has 52 values that are integers from 0 to 51. For chroma coding, the quantization step has values that are integers from 0 to 39. In addition, the quantization step increases as the quantization parameter increases. Each time the quantization parameter is increased by 6, the quantization step is doubled.

The entropy decoding is an inverse process of entropy coding, which is a data coding manner in which coding is performed based on an entropy principle without losing any information, and can express particular information by using a relatively small character. A method for entropy coding may be, for example, shannon coding or huffman coding.

Further, after the spatial residual information and the prediction information are obtained, the decoded image unit corresponding to the current to-be-decoded unit is obtained according to the spatial residual information and the prediction information. Specifically, the reconstructed image unit may be obtained through reconstruction according to the spatial residual information and the prediction information. Further, the reconstructed image unit is played or stored, or is played and stored.

Figure 10:
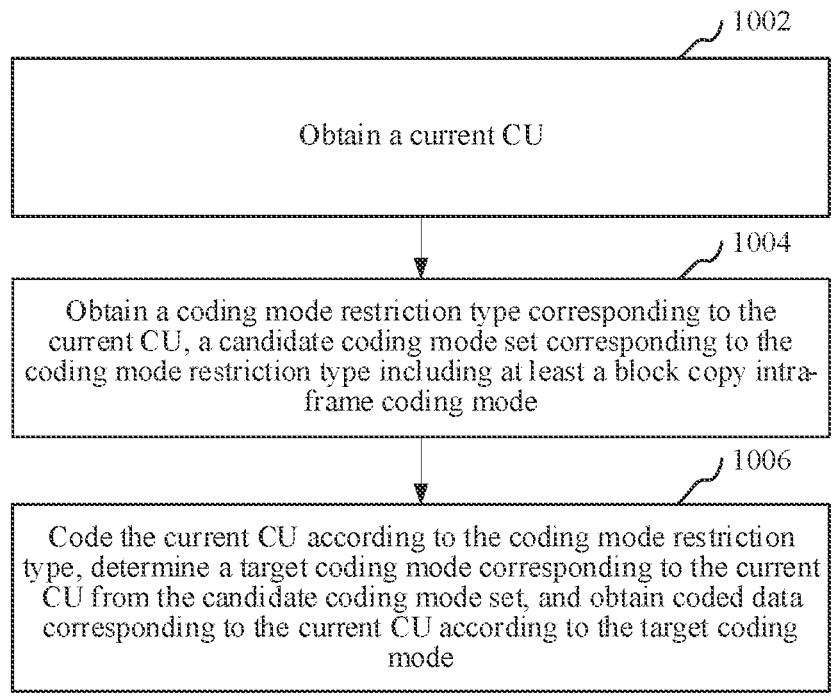
FIG. 10 is a flowchart of a data coding method according to an embodiment.

FIG. 10 is a flowchart of a data coding method according to an embodiment. In an embodiment, as shown in FIG. 10, a data coding method is provided. This embodiment is mainly described by using an example in which the method is applied to the terminal 110 or the server 120 in FIG. 1. Referring to FIG. 10, the data coding method specifically includes the following operations.

In operation 1002, the system obtains a current CU.

The current CU may refer to a CU that is currently coded. CUs are sub-blocks of a CTU. That is, CUs are units that form a CTU. A CTU is a quadtree or binary tree division structure, and is divided into layers recursively.

In operation 1004, the system obtains a coding mode restriction type corresponding to the current CU, a candidate coding mode set corresponding to the coding mode restriction type including at least a block copy intra-frame coding mode.

A coding process may include first obtaining the current CU, deciding the coding mode restriction type corresponding to the current CU, the coding mode restriction type being corresponding to a candidate coding mode, and then determining flag bit information corresponding to the current CU according to the decided coding mode restriction type, determining a target coding mode corresponding to the current CU according to the coding mode restriction type and the flag bit information, and obtaining coded data according to the target coding mode. That is, the coded data includes but is not limited to at least one corresponding syntax element in the coding mode restriction type or the target coding mode.

In some embodiments, the coding mode restriction type herein may refer to a type of a coding mode restriction. The coding mode restriction type is used for restricting whether a coding mode of a CU is restricted to a specific coding mode. The coding mode restriction type corresponds to candidate coding modes, and the candidate coding modes include a block copy intra-frame coding mode. The block copy intra-frame coding mode is similar to the common inter-frame coding mode. However, a difference lies in that reference block information of the common inter-frame coding mode is from a reference frame, while reference block information of the block copy intra-frame coding mode is from a current frame.

In an embodiment, during data coding, the coding mode restriction type may be decided as an intra-frame coding mode restriction type, an inter-frame coding mode restriction type, or a block copy intra-frame coding mode restriction type. A candidate coding mode corresponding to the intra-frame coding mode restriction type is a common intra-frame coding mode or a block copy intra-frame coding mode. A candidate coding mode corresponding to the inter-frame coding mode restriction type is a common inter-frame coding mode. A candidate coding mode corresponding to the block copy intra-frame coding mode restriction type is a block copy intra-frame coding mode. The common intra-frame coding mode herein may refer to a standard intra-frame coding mode, for example, an intra-frame coding mode in the related art. Similarly, the common inter-frame coding mode may refer to a standard inter-frame coding mode, for example, an inter-frame coding mode in the related art. The block copy intra-frame coding mode is similar to the common inter-frame coding mode. However, a difference lies in that reference block information of the common inter-frame coding mode is from a reference frame, while reference block information of the block copy intra-frame coding mode is from a current frame.

In another embodiment, during data coding, the coding mode restriction type may be decided as an intra-frame coding mode restriction type or an inter-frame coding mode restriction type. A candidate coding mode corresponding to the intra-frame coding mode restriction type is a common intra-frame coding mode. Candidate coding modes corresponding to the inter-frame coding mode restriction type include at least a common inter-frame coding mode and a block copy intra-frame coding mode. A candidate coding mode corresponding to the block copy intra-frame coding mode restriction type is a block copy intra-frame coding mode.

In operation 1006, the system codes the current CU according to the coding mode restriction type, determine a target coding mode corresponding to the current CU from the candidate coding mode set, and obtain coded data corresponding to the current CU according to the target coding mode.

During data coding, the coding mode restriction type may be decided as an intra-frame coding mode restriction type, an inter-frame coding mode restriction type, or a block copy intra-frame coding mode restriction type. Candidate coding modes corresponding to the intra-frame coding mode restriction type include at least a common intra-frame coding mode and a block copy intra-frame coding mode. A candidate coding mode corresponding to the inter-frame coding mode restriction type is a common inter-frame coding mode. A candidate coding mode corresponding to the block copy intra-frame coding mode restriction type is a block copy intra-frame coding mode.

A flag bit root_cu_mode for describing the coding mode restriction type may be added to the coded data. That is, a syntax element for describing the coding mode restriction type is added to the coded data. A value corresponding to the flag bit of the coding mode restriction type may be set to a name corresponding to the coding mode restriction type. For example, if the coding mode restriction type is the intra-frame coding mode restriction type, syntax in the coded data is: root_cu_mode='PRED_Intra_only'.

In some embodiments, when a flag bit corresponding to a corresponding candidate coding mode is determined according to the coding mode restriction type, a flag bit for describing a coding mode corresponding to the coding mode restriction type may be added to the coded data. Specifically, the coding mode corresponding to the coding mode restriction type may be determined according to a value corresponding to the flag bit.

For example, when the coding mode restriction type is the intra-frame coding mode restriction type, the candidate coding mode includes at least the common intra-frame coding mode and the block copy intra-frame coding mode. Therefore, ibc_flag may be added to the coded data, ibc_flag is flag bit information of the block copy intra-frame coding mode. Because the coding mode restriction type is the intra-frame coding mode restriction type, and the intra-frame coding mode restriction type includes the block copy intra-frame coding mode, ibc_flag may be added to the coded data. However, when a coding mode in the intra-frame coding mode restriction type is the common intra-frame coding mode, ibc_flag=0. When the coding mode in the intra-frame coding mode restriction type is the block copy intra-frame coding mode, ibc_flag=1. When the coding mode restriction type is the inter-frame coding mode restriction type, and the inter-frame coding mode restriction type is the common inter-frame coding mode, the syntax in the coded data is: root_cu_mode='PRED_Inter_only'. Because the coding mode restriction type of the current CU is the inter-frame coding mode restriction type, a coding mode of the current CU may only be the common inter-frame coding mode, and the flag bit information ibc_flag of the block copy intra-frame coding mode does not need to be added to the coded data. Instead, a syntax element corresponding to the common inter-frame coding mode is directly added to the coded data. For example, skip_flag is added to the coded data.

Further, when the coding mode restriction type is the block copy intra-frame coding mode restriction type, the coding mode of the current CU may only be the block copy intra-frame coding mode. Therefore, the flag bit information ibc_flag of the block copy intra-frame coding mode does not need to be transmitted or decoded. In this case, the syntax in the coded data is: root_cu_mode='PRED_Ibc_only'.

In this embodiment, the coding mode restriction type may alternatively be a common intra-frame coding mode restriction type. A coding mode of the common intra-frame coding mode restriction type may only be a common intra-frame coding mode. Therefore, ibc_flag also does not need to be added as a syntax element to the coded data.

According to the data coding method, a current CU is obtained, a coding mode restriction type corresponding to the current CU is obtained, a candidate coding mode set corresponding to the coding mode restriction type includes a block copy intra-frame coding mode, the current CU is coded according to the coding mode restriction type, a target coding mode corresponding to the current CU is determined from the candidate coding mode set, and coded data corresponding to the current CU is obtained according to the target coding mode. When the CU is coded, the coding mode restriction type can be flexibly selected. Candidate coding modes corresponding to the coding mode restriction type are not limited to one type, and the candidate coding modes include the block copy intra-frame coding mode. Therefore, a selection range for determining the target coding mode corresponding to the CU from at least one type of candidate coding mode is wider, and when coding is performed in the target coding mode, accurate coded data can be obtained.

Figure 11:
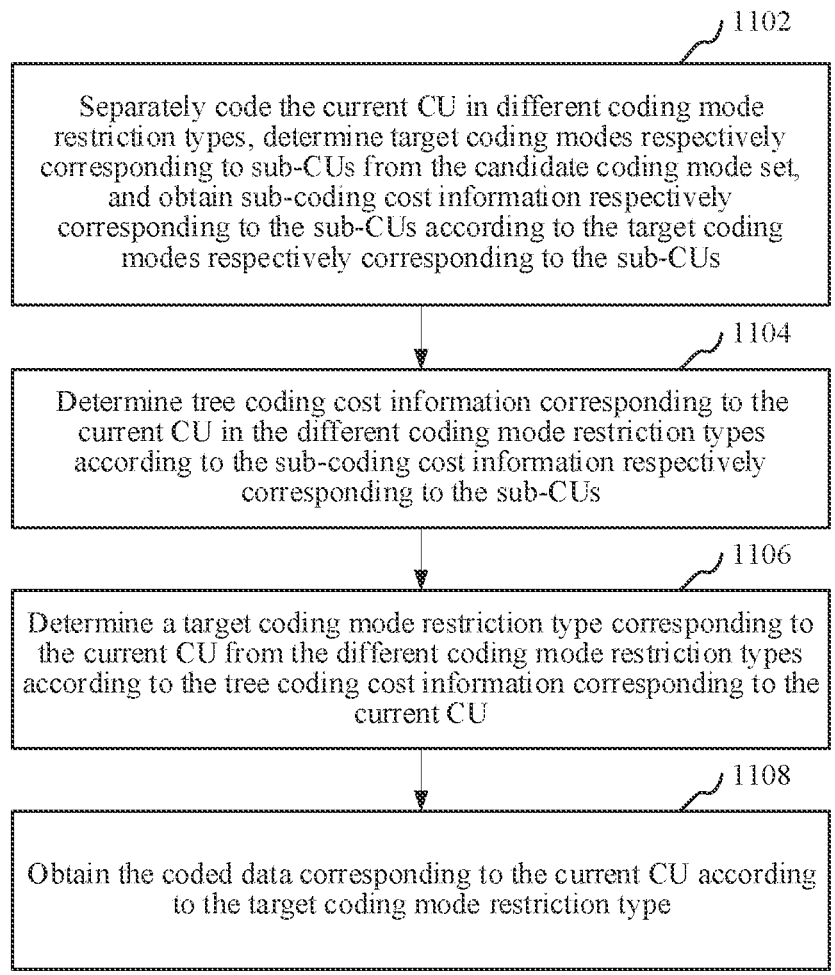
FIG. 11 is a flowchart of a data coding method according to an embodiment.

FIG. 11 is a flowchart of a data coding method according to an embodiment. In an embodiment, as shown in FIG. 11, the current CU is a CTU. The current CU includes a plurality of sub-CUs. The coding mode restriction type includes at least two different coding mode restriction types, and the data coding method further includes the following operations:

In operation 1102, the system separately codes the current CU in the different coding mode restriction types, determine target coding modes respectively corresponding to the sub-CUs from the candidate coding mode set, and obtain sub-coding cost information respectively corresponding to the sub-CUs according to the target coding modes respectively corresponding to the sub-CUs.

The current CU is the CTU. CUs are sub-blocks of the CTU. That is, the CUs are units that form the CTU. The CTU is a quadtree or binary tree division structure, and is divided into layers recursively. Finally, a CTU may include several CUs. A small block in each final leaf node in FIG. 5B is a CU, and the CTU is an entire set (an entire large block) formed by CUs.

The current CU includes a plurality of sub-CUs, and the coding mode restriction type includes at least two different coding mode restriction types. The sub-CUs herein are sub-blocks in the current CU and units that form the current CU. The coding mode restriction type herein includes at least two different coding mode restriction types. For example, the coding mode restriction type includes an intra-frame coding mode restriction type, an inter-frame coding mode restriction type, and a block copy intra-frame coding mode restriction type. The specific types of coding mode restriction types included by the coding mode restriction type may be determined by hardware, and the hardware may determine the coding mode restriction type according to its own hardware status.

The current CU is separately coded in the different coding mode restriction types. Because the coding mode restriction types correspond to candidate coding modes, target coding modes respectively corresponding to the sub-CUs are then determined from the candidate coding modes corresponding to the coding mode restriction types, and sub-coding cost information respectively corresponding to the sub-CUs is obtained according to the target coding modes respectively corresponding to the sub-CUs. The sub-coding cost information may be calculated during coding, while the sub-coding cost information is not calculated during decoding.

In an embodiment, the coding mode restriction type includes an intra-frame coding mode restriction type, an inter-frame coding mode restriction type, and a block copy intra-frame coding mode restriction type. Candidate coding modes corresponding to the intra-frame coding mode restriction type include a common intra-frame coding mode and a block copy intra-frame coding mode. Candidate coding modes corresponding to the inter-frame coding mode restriction type include only a common inter-frame coding mode. Candidate coding modes corresponding to the block copy intra-frame coding mode restriction type include only a block copy intra-frame coding mode. The current CU is separately coded in the intra-frame coding mode restriction type, the inter-frame coding mode restriction type, or the block copy intra-frame coding mode restriction type.

The current CU is coded in the intra-frame coding mode restriction type. The candidate coding modes respectively corresponding to the sub-CUs of the current CU may be the common intra-frame coding mode or the block copy intra-frame coding mode. Therefore, sub-coding cost information of the sub-CUs that is respectively obtained in the common intra-frame coding mode and sub-coding cost information of the sub-CUs that is respectively obtained in the block copy intra-frame coding mode are respectively obtained. Finally, the target coding mode corresponding to the sub-CUs is determined according to the sub-coding cost information in different coding modes, and sub-coding cost information corresponding to the target coding mode is determined as final sub-coding cost information of the sub-CUs.

The current CU is coded in the inter-frame coding mode restriction type. The candidate coding modes respectively corresponding to the sub-CUs of the current CU include only the common inter-frame coding mode, and sub-coding cost information of the sub-CUs that is obtained in the common inter-frame coding mode is then calculated.

Similarly, the current CU in the block copy intra-frame coding mode restriction type is coded. The candidate coding modes respectively corresponding to the sub-CUs of the current CU include only the block copy intra-frame coding mode, and sub-coding cost information of the sub-CUs that is obtained in the block copy intra-frame coding mode is then calculated.

In an embodiment, the coding mode restriction type includes at least two different coding mode restriction types, which may be an intra-frame coding mode restriction type and a block copy intra-frame coding mode restriction type. Candidate coding modes corresponding to the intra-frame coding mode restriction type include at least a common intra-frame coding mode and a block copy intra-frame coding mode. Candidate coding modes corresponding to the block copy intra-frame coding mode restriction type include only a block copy intra-frame coding mode.

In another embodiment, the coding mode restriction type includes at least two different coding mode restriction types, which may be, for example, an intra-frame coding mode restriction type, an inter-frame coding mode restriction type, and a block copy intra-frame coding mode restriction type. Candidate coding modes corresponding to the intra-frame coding mode restriction type include at least a common intra-frame coding mode and a block copy intra-frame coding mode. Candidate coding modes corresponding to the block copy intra-frame coding mode restriction type include only a block copy intra-frame coding mode. Candidate coding modes corresponding to the inter-frame coding mode restriction type include only a common inter-frame coding mode.

In another embodiment, the coding mode restriction type includes at least two different coding mode restriction types, which may be at least two of an intra-frame coding mode restriction type, an inter-frame coding mode restriction type, a block copy intra-frame coding mode restriction type, and a common intra-frame coding mode restriction type. Candidate coding modes corresponding to the intra-frame coding mode restriction type include at least a common intra-frame coding mode and a block copy intra-frame coding mode. Candidate coding modes corresponding to the block copy intra-frame coding mode restriction type include only a block copy intra-frame coding mode. Candidate coding modes corresponding to the inter-frame coding mode restriction type include only a common inter-frame coding mode. Candidate coding modes corresponding to the common intra-frame coding mode restriction type include only a common intra-frame coding mode.

In an embodiment, the coding mode restriction type includes at least two different coding mode restriction types, which may be specifically decided by a hardware manufacturer. Examples in this disclosure do not limit the scope of this disclosure.

In operation 1104, the system determines tree coding cost information corresponding to the current CU in the different coding mode restriction types according to the sub-coding cost information respectively corresponding to the sub-CUs.

After the sub-coding cost information respectively corresponding to the sub-CUs is obtained according to the target coding modes respectively corresponding to the sub-CUs, the tree coding cost information corresponding to the current CU in the different coding mode restriction types may be determined according to the sub-coding cost information respectively corresponding to the sub-CUs. The determining manner may be customized. Customization may be to use the sub-coding cost information with the smallest value in the sub-coding cost information respectively corresponding to the sub-CUs as the tree coding cost information corresponding to the current CU in the different coding mode restriction types, or it may be to calculate an average value according to the sub-coding cost information respectively corresponding to the sub-CUs, and use the sub-coding cost information with the smallest average value as the tree coding cost information corresponding to the current CU in the different coding mode restriction types, and so on.

For example, a current CU is a CTU. The current CU includes a sub-CU 1, a sub-CU 2, and a sub-CU 3. The coding mode restriction types include an intra-frame coding mode restriction type, an inter-frame coding mode restriction type, and a block copy intra-frame coding mode restriction type. If sub-coding cost information corresponding to the sub-CU 1 in the intra-frame coding mode restriction type is 390, sub-coding cost information corresponding to the sub-CU 2 is 350, and sub-coding cost information corresponding to the sub-CU 3 is 300, the sub-coding cost information corresponding to the sub-CU 3 may be used as tree coding cost information corresponding to the current CU in the intra-frame coding mode restriction type.

In operation 1106, the system determines a target coding mode restriction type corresponding to the current CU from the different coding mode restriction types according to the tree coding cost information corresponding to the current CU.

After it is determined that the tree coding cost information corresponding to the current CU in the different coding mode restriction types is obtained, the target coding mode restriction type corresponding to the current CU may be determined from the different coding mode restriction types according to the tree coding cost information corresponding to the current CU. The determining manner may be customized. Customization may be to determine the coding mode restriction type corresponding to the tree coding cost information with the smallest value in the tree coding cost information corresponding to the current CU as the target coding mode restriction type corresponding to the current CU. Alternatively, a preset condition may be further set according to an actual requirement or an actual application scenario. The target coding mode restriction type that meets the preset condition is selected from the different coding mode restriction types according to the preset condition and the tree coding cost information corresponding to the current CU.

In operation 1108, the system obtains the coded data corresponding to the current CU according to the target coding mode restriction type.

After the target coding mode restriction type corresponding to the current CU is determined, the coded data corresponding to the current CU may be obtained according to the target coding mode restriction type. Specifically, a flag bit, for example, root_cu_mode, for describing the coding mode restriction type may be added to the coded data. That is, a syntax element for describing the coding mode restriction type is added to the coded data. A value corresponding to the flag bit of the coding mode restriction type may be set to a name corresponding to the coding mode restriction type. For example, if the coding mode restriction type is the intra-frame coding mode restriction type, syntax in the coded data is: root_cu_mode='PRED_Intra_only'.

Figure 12:
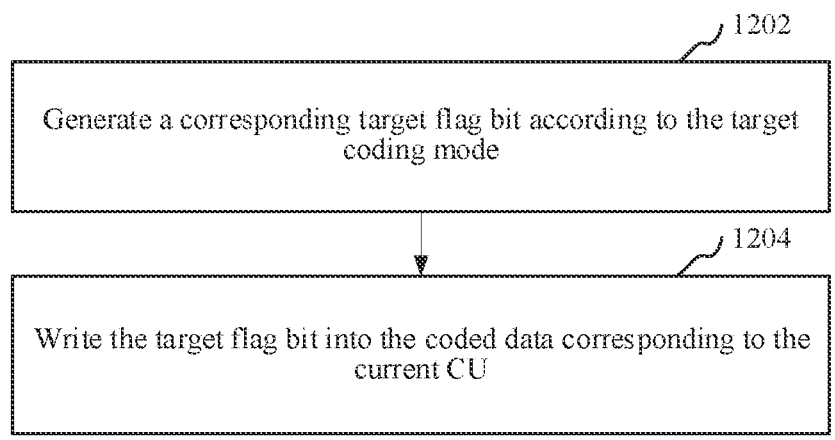
FIG. 12 is a flowchart of a method for generating coded data according to an embodiment.

FIG. 12 is a flowchart of a method for generating coded data according to an embodiment. In an embodiment, as shown in FIG. 12, the obtaining the coded data corresponding to the current CU according to the target coding mode includes the following operations:

In operation 1202, the system generates a corresponding target flag bit according to the target coding mode.

In operation 1204, the system writes the target flag bit into the coded data corresponding to the current CU.

When the coding mode restriction type is an intra-frame coding mode restriction type, an inter-frame coding mode restriction type, or a block copy intra-frame coding mode restriction type, a corresponding target flag bit is generated according to the target coding mode. The target flag bit herein may refer to a flag bit related to the candidate coding mode corresponding to the coding mode restriction type. Finally, the target flag bit is written into the coded data corresponding to the current CU.

In an embodiment, when the coding mode restriction type is the intra-frame coding mode restriction type, candidate coding modes corresponding to the intra-frame coding mode restriction type include a common intra-frame coding mode and a block copy intra-frame coding mode, and flag bit information ibc_flag used for describing the block copy intra-frame coding mode may be added to the coded data. That is, ibc_flag is written into the coded data corresponding to the current CU, and the syntax in the coded data is:
 root_cu_mode='PRED_Intra_only';
 ibc_flag=ae(v);
 where the common intra-frame coding mode and the block copy intra-frame coding mode may be specifically distinguished according to a set value of ae(v). For example, if ae(v) is 0, it indicates that the coding mode is the common intra-frame coding mode, and if ae(v) is 1, it indicates that the coding mode is the block copy intra-frame coding mode.

In another embodiment, when the coding mode restriction type is the inter-frame coding mode restriction type, candidate coding modes corresponding to the inter-frame coding mode restriction type include a common inter-frame coding mode and a block copy intra-frame coding mode, and flag bit information ibc_flag used for describing the block copy intra-frame coding mode may be added to the coded data. That is, ibc_flag is written into the coded data corresponding to the current CU, and the syntax in the coded data is:
 root_cu_mode='PRED_Inter_only';
 ibc_flag=ae(v);
 where the common inter-frame coding mode and the block copy intra-frame coding mode may be specifically distinguished according to a set value of ae(v). For example, if ae(v) is 0, it indicates that the coding mode is the common inter-frame coding mode, and if ae(v) is 1, it indicates that the coding mode is the block copy intra-frame coding mode.

In one embodiment, a data coding method and a data decoding method are provided and specifically include the following operations:

(1): Obtain a current CU.

(2): Obtain a coding mode restriction type corresponding to the current CU, a candidate coding mode set corresponding to the coding mode restriction type including at least a block copy intra-frame coding mode.

(3): Code the current CU according to the coding mode restriction type, determine a target coding mode corresponding to the current CU from the candidate coding mode set, and obtain coded data corresponding to the current CU according to the target coding mode.

(3-1): Generate a corresponding target flag bit according to the target coding mode when the coding mode restriction type is an intra-frame coding mode restriction type or an inter-frame coding mode restriction type.

(3-2): Write the target flag bit into the coded data corresponding to the current CU.

(4): The current CU is a CTU and includes a plurality of sub-CUs, and the coding mode restriction type includes at least two different coding mode restriction types. Separately code the current CU in the different coding mode restriction types, determine target coding modes respectively corresponding to the sub-CUs from the candidate coding mode set, and obtain sub-coding cost information respectively corresponding to the sub-CUs according to the target coding modes respectively corresponding to the sub-CUs.

(5): Determine tree coding cost information corresponding to the current CU in the different coding mode restriction types according to the sub-coding cost information respectively corresponding to the sub-CUs.

(6): Determine a target coding mode restriction type corresponding to the current CU from the different coding mode restriction types according to the tree coding cost information corresponding to the current CU.

(7): Obtain the coded data corresponding to the current CU according to the target coding mode restriction type.

(8): Obtain coded data corresponding to a current to-be-decoded unit.

(9): Parse the coded data to obtain a coding mode restriction type corresponding to the current to-be-decoded unit.

(10): Determine a target coding mode corresponding to the current to-be-decoded unit according to the coding mode restriction type, the target coding mode being one of candidate coding modes, and the candidate coding modes include a block copy intra-frame coding mode.

(10-1): Parse the coded data to obtain flag bit information corresponding to the current to-be-decoded unit.

(10-2): Determine the target coding mode corresponding to the current to-be-decoded unit according to the coding mode restriction type and the flag bit information.

(10-2-1): When the coding mode restriction type is an intra-frame coding mode restriction type, determine the target coding mode as a common intra-frame coding mode when a value corresponding to the flag bit information is a first flag bit value, and determine the target coding mode as the block copy intra-frame coding mode when the value corresponding to the flag bit information is a second flag bit value.

(10-2-2): When the coding mode restriction type is an inter-frame coding mode restriction type, determine the target coding mode as a common inter-frame coding mode when a value corresponding to the flag bit information is a first flag bit value, and determine the target coding mode as the block copy intra-frame coding mode when the value corresponding to the flag bit information is a second flag bit value.

(10-3): Directly determine the target coding mode corresponding to the current to-be-decoded unit as the block copy intra-frame coding mode when the coding mode restriction type is a block copy intra-frame coding mode restriction type.

(10-4): Determine the target coding mode corresponding to the current to-be-decoded unit as a common intra-frame coding mode when the decoded coding mode restriction type is a common intra-frame coding mode restriction type.

(10-5): Determine the target coding mode corresponding to the current to-be-decoded unit as a common inter-frame coding mode when the coding mode restriction type is a common inter-frame coding mode restriction type.

(11): Decode the current to-be-decoded unit according to the target coding mode, to obtain corresponding decoded data.

(11-1): Obtain, from the coded data when the target coding mode is the block copy intra-frame coding mode, block vector information and residual information that correspond to the current to-be-decoded unit.

(11-2): Determine prediction information corresponding to the current to-be-decoded unit according to the block vector information.

(11-3): Obtain a decoded image unit corresponding to the current to-be-decoded unit according to the residual information and the prediction information.

In this embodiment, when the CU is coded, the coding mode restriction type can be flexibly selected. Candidate coding modes corresponding to the coding mode restriction type are not limited to one type, and the candidate coding modes include the block copy intra-frame coding mode. Therefore, a selection range for determining the target coding mode corresponding to the CU from at least one type of candidate coding mode is wider, and when coding is performed in the target coding mode, accurate coded data can be obtained. In addition, during decoding of the to-be-decoded unit, decoding can be flexibly performed according to the target coding mode, thereby obtaining accurate decoded data corresponding to the to-be-decoded unit.

It is to be understood that although the steps in the flowchart are sequentially shown according to indication of an arrow, the steps are not necessarily sequentially performed according to a sequence indicated by the arrow. Unless otherwise explicitly specified in this specification, execution of the steps is not strictly limited, and the steps may be performed in other sequences. Besides, at least some steps in the flowchart may include a plurality of sub-steps or a plurality of stages, the sub-steps or stages are not necessarily performed at the same moment and may be performed at different moments, the sub-steps or stages are not necessarily sequentially performed, and the sub-steps or stages and at least some of other steps or sub-steps or stages of other steps may be performed in turn or alternately.

Figure 13:
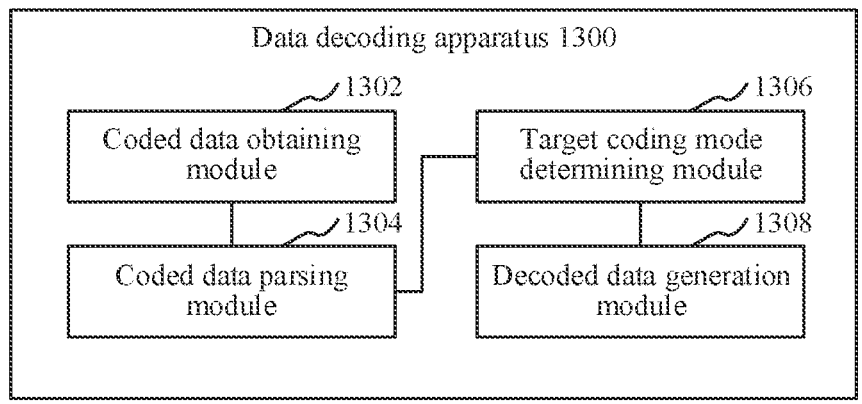
FIG. 13 is a block diagram of a data decoding apparatus according to an embodiment.

FIG. 13 is a block diagram of a data decoding apparatus according to an embodiment. In an embodiment, as shown in FIG. 13, a data decoding apparatus 1300 is provided. The data decoding apparatus 1300 may be integrated into the foregoing server 120 or terminal 110, and may include a coded data obtaining module 1302, a coded data parsing module 1304, a target coding mode determining module 1306, and a decoded data generation module 1308.

The coded data obtaining module 1302 is configured to obtain coded data corresponding to a current to-be-decoded unit.

The coded data parsing module 1304 is configured to decode the coded data to obtain a coding mode restriction type corresponding to the current to-be-decoded unit.

The target coding mode determining module 1306 is configured to determine a candidate coding mode set corresponding to the current to-be-decoded unit according to the coding mode restriction type, and select a target coding mode from the candidate coding mode set, the candidate coding mode set including at least a block copy intra-frame coding mode.

The decoded data generation module 1308 is configured to decode the current to-be-decoded unit according to the target coding mode to obtain corresponding decoded data.

Figure 14:
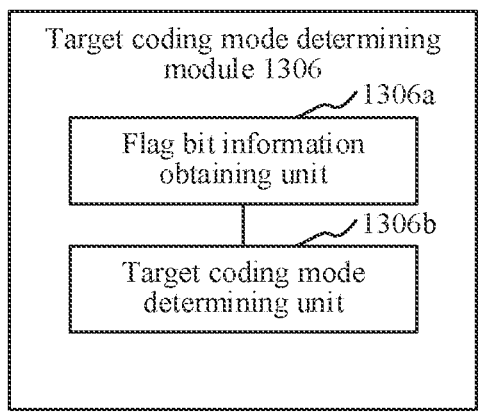
FIG. 14 is a block diagram of a target coding mode selection module according to an embodiment.

FIG. 14 is a block diagram of a target coding mode selection module according to an embodiment. In an embodiment, as shown in FIG. 14, the target coding mode determining module 1306 includes a flag bit information obtaining unit 1306a, configured to decode the coded data to obtain coding mode flag bit information corresponding to the current to-be-decoded unit, and a target coding mode determining unit 1306b configured to determine the target coding mode corresponding to the current to-be-decoded unit according to the coding mode restriction type and the coding mode flag bit information.

In an embodiment, the target coding mode determining unit 1306b is configured to determine, according to the coding mode restriction type, whether coding mode flag bit information related to the block copy intra-frame coding mode is to be read, and determine, when the coding mode flag bit information is to be read, the candidate coding mode set according to the coding mode flag bit information after the coding mode flag bit information related to the block copy intra-frame coding mode is read.

In an embodiment, the coding mode restriction type is an intra-frame coding mode restriction type. The target coding mode determining module 1306 is further configured to determine the target coding mode as a common intra-frame coding mode when a value corresponding to the coding mode flag bit information is a first flag bit value, or determine the target coding mode as a block copy intra-frame coding mode when a value corresponding to the coding mode flag bit information is a second flag bit value.

In an embodiment, the coding mode restriction type is an inter-frame coding mode restriction type. The target coding mode determining module 1306 is further configured to determine the target coding mode as a common inter-frame coding mode when a value corresponding to the coding mode flag bit information is a first flag bit value, or determine the target coding mode as the block copy intra-frame coding mode w % ben a value corresponding to the coding mode flag bit information is a second flag bit value.

In an embodiment, the coding mode restriction type is a block copy intra-frame coding mode restriction type. The target coding mode determining module 1306 is further configured to directly determine the target coding mode corresponding to the current to-be-decoded unit as the block copy intra-frame coding mode.

In an embodiment, the data decoding apparatus 1300 is further configured to determine the target coding mode corresponding to the current to-be-decoded unit as a common intra-frame coding mode when the coding mode restriction type obtained through decoding is a common intra-frame coding mode restriction type.

In an embodiment, the data decoding apparatus 1300 is further configured to determine the target coding mode corresponding to the current to-be-decoded unit as a common inter-frame coding mode when the coding mode restriction type obtained through decoding is a common inter-frame coding mode restriction type.

Figure 15:
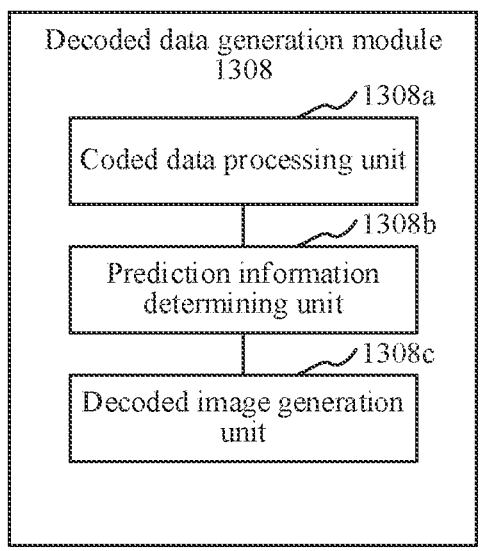
FIG. 15 is a block diagram of a decoded data generation module according to an embodiment.

FIG. 15 is a block diagram of a decoded data generation module according to an embodiment. In an embodiment, as shown in FIG. 15, the decoded data generation module 1308 includes a coded data processing unit 1308a, configured to obtain, from the coded data when the target coding mode is the block copy intra-frame coding mode, block vector information and residual information that correspond to the current to-be-decoded unit, a prediction information determining unit 1308b, configured to determine prediction information corresponding to the current to-be-decoded unit according to the block vector information, and a decoded image generation unit 1308c, configured to obtain a decoded image unit corresponding to the current to-be-decoded unit according to the residual information and the prediction information.

Figure 16:
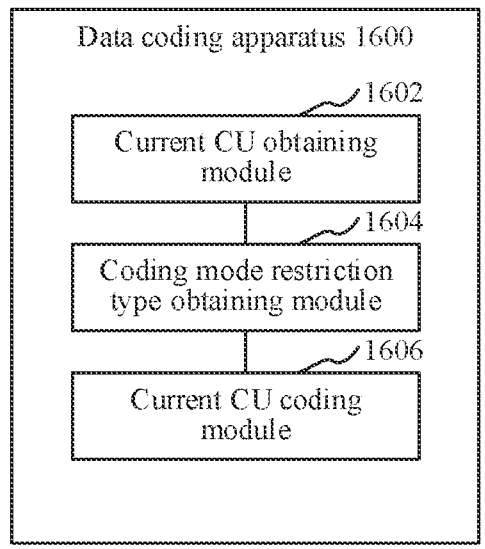
FIG. 16 is a block diagram of a data coding apparatus according to an embodiment.

FIG. 16 is a block diagram of a data coding apparatus according to an embodiment. In an embodiment, as shown in FIG. 16, a data coding apparatus 1600 is provided. The data coding apparatus 1600 may be integrated into the foregoing server 120 or terminal 110, and may specifically include a current CU obtaining module 1602, a coding mode restriction type obtaining module 1604, and a current CU coding module 1606.

The current CU obtaining module 1602 is configured to obtain a current CU.

The coding mode restriction type obtaining module 1604 is configured to obtain a coding mode restriction type corresponding to the current CU, a candidate coding mode set corresponding to the coding mode restriction type including at least a block copy intra-frame coding mode.

The current CU coding module 1606 is configured to code the current CU according to the coding mode restriction type, determine a target coding mode corresponding to the current CU from the candidate coding mode set, and obtain coded data corresponding to the current CU according to the target coding mode.

Figure 17:
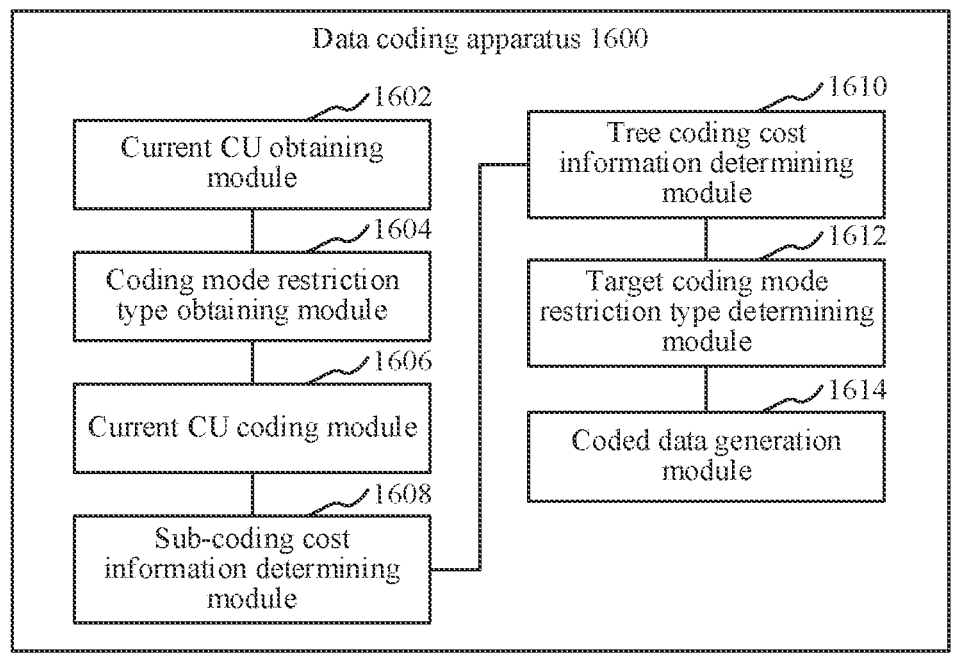
FIG. 17 is a block diagram of a data coding apparatus according to an embodiment.

FIG. 17 is a block diagram of a data coding apparatus according to an embodiment. In an embodiment, as shown in FIG. 17, the current CU is a CTU. The current CU includes a plurality of sub-CUs. The coding mode restriction type includes at least two different coding mode restriction types, and the data coding apparatus 1600 further includes a sub-coding cost information determining module 1608, configured to: separately code the current CU in the different coding mode restriction types, determine target coding modes respectively corresponding to the sub-CUs from the candidate coding mode set, and obtain sub-coding cost information respectively corresponding to the sub-CUs according to the target coding modes respectively corresponding to the sub-CUs, a tree coding cost information determining module 1610, configured to determine tree coding cost information corresponding to the current CU in the different coding mode restriction types according to the sub-coding cost information respectively corresponding to the sub-CUs, a target coding mode restriction type determining module 1612, configured to determine a target coding mode restriction type corresponding to the current CU from the different coding mode restriction types according to the tree coding cost information corresponding to the current CU, and a coded data generation module 1614, configured to obtain the coded data corresponding to the current CU according to the target coding mode restriction type.

In an embodiment, the current CU coding module 1606 is further configured to generate a corresponding target flag bit according to the target coding mode when the coding mode restriction type is an intra-frame coding mode restriction type or an inter-frame coding mode restriction type, and write the target flag bit into the coded data corresponding to the current CU.

In an embodiment, the coding mode restriction type includes one of the following combinations: a combination of an intra-frame coding mode restriction type and a block copy intra-frame coding mode restriction type, a combination of an inter-frame coding mode restriction type and a block copy intra-frame coding mode restriction type, or a combination of an intra-frame coding mode restriction type, an inter-frame coding mode restriction type, and a block copy intra-frame coding mode restriction type.

Figure 18:
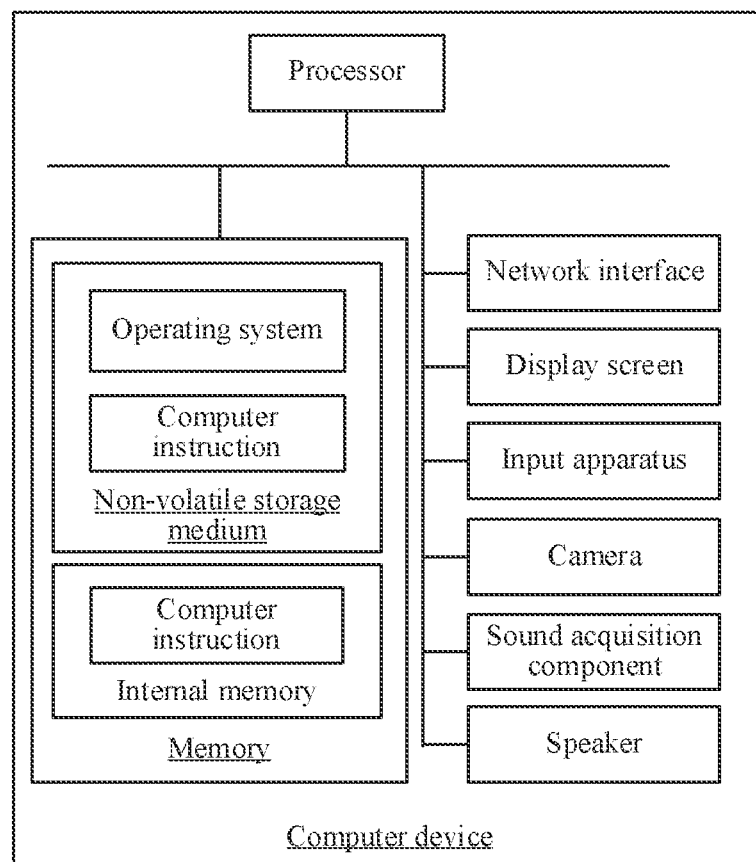
FIG. 18 is a block diagram of a computer device according to an embodiment.

FIG. 18 is a block diagram of a computer device according to an embodiment. The computer device may be specifically the terminal 110 or the server 120 in FIG. 1. As shown in FIG. 18, the computer device includes a processor, a memory, a network interface, an input apparatus, and a display screen that are connected by using a system bus. The memory includes a non-volatile storage medium and an internal memory. The non-volatile storage medium of the computer device stores an operating system, and may further store computer-readable instructions. The computer-readable instructions, when executed by the processor, may cause the processor to implement the data decoding method or the data coding method. The internal memory may also store computer-readable instructions. The computer-readable instructions, when executed by the processor, may cause the processor to implement the data decoding method or the data coding method. The display screen of the computer device may be a liquid crystal display screen or an e-ink display screen. The input apparatus of the computer device may be a touch layer covering the display screen, or a button, a trackball, or a touchpad disposed on a housing of the computer device, or an external keyboard, touchpad, mouse, or the like.

A person skilled in the art may understand that, the structure shown in FIG. 18 is only a block diagram of a part of a structure related to a solution of this disclosure and does not limit the computer device to which the solution of this disclosure is applied. Specifically, the computer device may include more or fewer components than those in the drawings, or some components are combined, or a different component deployment is used.

In an embodiment, a data decoding apparatus or a data coding apparatus provided in this disclosure may be implemented in a form of computer-readable instructions, and the computer-readable instructions may run on the computer device shown in FIG. 18. The memory of the computer device may store program modules forming the data decoding apparatus or the data coding apparatus, for example, the coded data obtaining module, the coded data parsing module, the target coding mode determining module, and the decoded data generation module shown in FIG. 13. Computer-readable instructions formed by the program modules cause the processor to perform the steps in the data decoding method in the embodiments of this disclosure described in this specification.

In another embodiment, the current CU obtaining module, the coding mode restriction type obtaining module, and the current CU coding module shown in FIG. 16 are stored in the memory of the computer device. Computer-readable instructions formed by the program modules cause the processor to perform the steps in the data coding method in the embodiments of this disclosure described in this specification.

For example, the computer device shown in FIG. 18 may obtain coded data corresponding to a current to-be-decoded unit by using the coded data obtaining module in the data decoding apparatus shown in FIG. 13. The computer device may decode the coded data by using the coded data parsing module, to obtain a coding mode restriction type corresponding to the current to-be-decoded unit. The computer device may determine a candidate coding mode set corresponding to the current to-be-decoded unit according to the coding mode restriction type by using the target coding mode determining module, the candidate coding mode set including at least a block copy intra-frame coding mode. The computer device may decode, by using the decoded data generation module, the current to-be-decoded unit according to the target coding mode selected from the candidate coding mode set to obtain corresponding decoded data.

In another example, the computer device shown in FIG. 18 may obtain a current CU by using the current CU obtaining module in the data coding apparatus shown in FIG. 16. The computer device may obtain a coding mode restriction type corresponding to the current CU by using the coding mode restriction type obtaining module, a candidate coding mode set corresponding to the coding mode restriction type including a block copy intra-frame coding mode. The computer device may code the current CU according to the coding mode restriction type by using the current CU coding module, determine a target coding mode corresponding to the current CU from the candidate coding mode set, and obtain coded data corresponding to the current CU according to the target coding mode.

In an embodiment, a computer device is provided, including a memory and a processor. The memory stores computer-readable instructions, the computer-readable instructions, when executed by the processor, causing the processor to perform the steps of the foregoing data decoding method or the data coding method. The steps of the data decoding method or the data coding method herein may be the steps of the data decoding method or the data coding method in the foregoing embodiments.

In an embodiment, a computer-readable storage medium is provided, storing computer-readable instructions. The computer-readable instructions, when executed by a processor, causes the processor to perform the steps of the foregoing data decoding method or the data coding method. The steps of the data decoding method or the data coding method herein may be the steps of the data decoding method or the data coding method in the foregoing embodiments.

In an embodiment, a computer-readable instruction product or computer-readable instructions are provided, the computer-readable instruction product or the computer-readable instructions include computer instructions, and the computer instructions are stored in a computer-readable storage medium. The processor of the computer device reads the computer instructions from the computer-readable storage medium, and the processor executes the computer instructions, to cause the computer device to perform the steps in the method embodiments.

A person of ordinary skill in the art may understand that all or some of procedures of the method in the foregoing embodiments may be implemented by instructing relevant hardware by using computer-readable instructions. The computer-readable instructions may be stored in a non-volatile computer-readable storage medium. When the computer-readable instructions are executed, the procedures of the foregoing method embodiments may be implemented. Any reference to a memory, storage, database, or another medium used in the embodiments provided may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a RAM bus (Rambus) direct RAM (RDRAM), a direct Rambus dynamic RAM (DRDRAM), and a Rambus dynamic RAM (RDRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this disclosure.

The foregoing embodiments only show several implementations of this disclosure, and descriptions thereof are in detail, but are not to be understood as a limitation to the patent scope of this disclosure. A person of ordinary skill in the art may further make several variations and improvements without departing from the ideas of this disclosure, and such variations and improvements all fall within the protection scope of the disclosure. Therefore, the protection scope of this disclosure is subject to the protection scope of the appended claims.

What is claimed is:

1. A data decoding method, performed by a computer device, the data decoding method comprising:
    obtaining coded data corresponding to a current to-be-decoded unit;
    obtaining a syntax indicating a coding mode restriction type corresponding to the current to-be-decoded unit by decoding the coded data, the coding mode restriction type indicating which coding mode of the current to-be-decoded unit that decoding of the current to-be-decoded unit is restricted to;
    determining a candidate coding mode set corresponding to the current to-be-decoded unit according to the coding mode restriction type, the candidate coding mode set comprising a block copy intra-frame coding mode;

selecting a target coding mode from the candidate coding mode set; and decoding the current to-be-decoded unit according to the target coding mode, thereby obtaining corresponding decoded data.

2. The data decoding method of claim 1, wherein the selecting the target coding mode from the candidate coding mode set comprises:

obtaining coding mode flag bit information corresponding to the current to-be-decoded unit by decoding the coded data, the coding mode flag bit information indicating which coding mode that decoding of the current to-be-decoded unit is restricted to; and determining the target coding mode corresponding to the current to-be-decoded unit according to the coding mode restriction type and the coding mode flag bit information.

3. The data decoding method of claim 2, wherein the determining the target coding mode corresponding to the current to-be-decoded unit according to the coding mode restriction type and the coding mode flag bit information comprises:

determining, according to the coding mode restriction type, that the coding mode flag bit information related to the block copy intra-frame coding mode needs to be read; and determining, based on determining that the coding mode flag bit information needs to be read, the candidate coding mode set according to the coding mode flag bit information after the coding mode flag bit information related to the block copy intra-frame coding mode is read.

4. The data decoding method of claim 2, wherein the syntax indicates that the coding mode restriction type is an intra-frame coding mode restriction type that indicates that the coding mode for the decoding the current to-be-decoded unit is restricted to an intra-frame coding mode, and the selecting the target coding mode corresponding to the current to-be-decoded unit according to the coding mode restriction type and the coding mode flag bit information comprises:

determining the target coding mode as a common intra-frame coding mode based on a value corresponding to the coding mode flag bit information being a first flag bit value; or determining the target coding mode as the block copy intra-frame coding mode based on a value corresponding to the coding mode flag bit information being a second flag bit value.

5. The data decoding method of claim 4, wherein the coding mode flag bit information is ibc_flag or flag bit information related to ibc_flag.

6. The data decoding method of claim 4, wherein flag bit information of the block copy intra-frame coding mode is ibc_flag, and wherein, based on the coding mode in the intra-frame coding mode restriction type being the common intra-frame coding mode, ibc_flag is set to 0; or based on the coding mode in the intra-frame coding mode restriction type being the block copy intra-frame coding mode, ibc_flag is set to 1.

7. The data decoding method of claim 2, wherein the coding mode restriction type is an inter-frame coding mode restriction type that indicates that the coding mode for the decoding the current to-be-decoded unit is restricted to an inter-frame coding mode, and the determining the target coding mode corresponding to the current to-be-decoded unit according to the coding mode restriction type and the coding mode flag bit information comprises:

determining the target coding mode as a common inter-frame coding mode based on a value corresponding to the coding mode flag bit information being a first flag bit value; or determining the target coding mode as the block copy intra-frame coding mode based on a value corresponding to the coding mode flag bit information being a second flag bit value.

8. The data decoding method of claim 1, wherein the syntax in the coded data is root_cu_mode='PRED_Inter_only', and the syntax indicates that the coding mode restriction type is an inter-frame coding mode restriction type that indicates that the coding mode for the decoding the current to-be-decoded unit is restricted to an inter-frame coding mode, and the target coding mode is a common inter-frame coding mode.

9. The data decoding method of claim 1, wherein the syntax in the coded data indicates that the coding mode restriction type is an inter-frame coding mode restriction type that indicates that the coding mode for the decoding the current to-be-decoded unit is restricted to an inter-frame coding mode, the target coding mode is a common inter-frame coding mode, and an additional syntax in the coded data is skip_flag.

10. The data decoding method of claim 1, wherein the coding mode restriction type is a block copy intra-frame coding mode restriction type that indicates that a coding mode for the decoding the current to-be-decoded unit is restricted to the block copy intra-frame coding mode, and wherein the selecting the target coding mode from the candidate coding mode set comprises:

determining the target coding mode corresponding to the current to-be-decoded unit as the block copy intra-frame coding mode based on the block copy intra-frame coding mode restriction type.

11. The data decoding method of claim 10, wherein the syntax in the coded data is root_cu_mode='PRED_Ibc_only', and the determining the target coding mode corresponding to the current to-be-decoded unit as the block copy intra-frame coding mode comprises determining the target coding mode based on the syntax in the coded data, and without transmitting and decoding flag bit information of the block copy intra-frame coding mode.

12. The data decoding method of claim 1, further comprising:

determining the target coding mode corresponding to the current to-be-decoded unit as a common intra-frame coding mode based on the coding mode restriction type obtained through decoding being a common intra-frame coding mode restriction type that indicates that the coding mode for the decoding the current to-be-decoded unit is restricted to the common intra-frame coding mode.

13. The data decoding method of claim 1, further comprising:

determining the target coding mode corresponding to the current to-be-decoded unit as a common inter-frame coding mode based on the coding mode restriction type obtained through decoding being a common inter-frame coding mode restriction type that indicates that the coding mode for the decoding the current to-be-decoded unit is restricted to the common inter-frame coding mode.

14. The data decoding method of claim 1, wherein the decoding the current to-be-decoded unit according to the target coding mode to obtain corresponding decoded data comprises:
obtaining, from the coded data based on the target coding mode being the block copy intra-frame coding mode, block vector information and residual information that correspond to the current to-be-decoded unit;
determining prediction information corresponding to the current to-be-decoded unit according to the block vector information; and
obtaining a decoded image unit corresponding to the current to-be-decoded unit according to the residual information and the prediction information.

15. An apparatus for data decoding, the apparatus comprising:
at least one memory configured to store computer program code; and
at least one processor configured to access said computer program code and operate as instructed by said computer program code, said computer program code including:
first obtaining code configured to cause the at least one processor to obtain coded data corresponding to a current to-be-decoded unit;
second obtaining code configured to cause the at least one processor to obtain a syntax indicating a coding mode restriction type corresponding to the current to-be-decoded unit by decoding the coded data, the coding mode restriction type indicating which coding mode of the current to-be-decoded unit that decoding of the current to-be-decoded unit is restricted to;
determining code configured to cause the at least one processor to determine a candidate coding mode set corresponding to the current to-be-decoded unit according to the coding mode restriction type, the candidate coding mode set comprising a block copy intra-frame coding mode;
selecting code configured to cause the at least one processor to select a target coding mode from the candidate coding mode set; and
decoding code configured to cause the at least one processor to decode the current to-be-decoded unit according to the target coding mode, thereby obtaining corresponding decoded data.

16. The apparatus of claim 15, wherein the selecting code is further configured to cause the at least one processor to:
obtain coding mode flag bit information corresponding to the current to-be-decoded unit by decoding the coded data, the coding mode flag bit information indicating which coding mode that decoding of the current to-be-decoded unit is restricted to; and
determine the target coding mode corresponding to the current to-be-decoded unit according to the coding mode restriction type and the coding mode flag bit information.

17. The apparatus of claim 16, wherein the coding mode restriction type is an intra-frame coding mode restriction type that indicates that the coding mode for the decoding the current to-be-decoded unit is restricted to an intra-frame coding mode, and the selecting code is further configured to cause the at least one processor to:
determine the target coding mode as a common intra-frame coding mode based on a value corresponding to the coding mode flag bit information being a first flag bit value; or
determine the target coding mode as the block copy intra-frame coding mode based on a value corresponding to the coding mode flag bit information being a second flag bit value.

18. The apparatus of claim 17, wherein the coding mode flag bit information is ibc_flag or flag bit information related to ibc_flag.

19. The apparatus of claim 17, wherein flag bit information of the block copy intra-frame coding mode is ibc_flag, and
wherein, based on the coding mode in the intra-frame coding mode restriction type being the common intra-frame coding mode, ibc_flag is set to 0; and based on the coding mode in the intra-frame coding mode restriction type being the block copy intra-frame coding mode, ibc_flag is set to 1.

20. A non-transitory computer-readable storage medium storing computer instructions that, when executed by at least one processor of a device, cause the at least one processor to:
obtain coded data corresponding to a current to-be-decoded unit;
obtain a syntax indicating coding mode restriction type corresponding to the current to-be-decoded unit by decoding the coded data, the coding mode restriction type indicating which coding mode of the current to-be-decoded unit that decoding of the current to-be-decoded unit is restricted to;
determine a candidate coding mode set corresponding to the current to-be-decoded unit according to the coding mode restriction type, the candidate coding mode set comprising a block copy intra-frame coding mode;
select a target coding mode from the candidate coding mode set; and
decode the current to-be-decoded unit according to the target coding mode, thereby obtaining corresponding decoded data.

* * * * *